(12) United States Patent
Kuwano et al.

(10) Patent No.: US 7,380,118 B2
(45) Date of Patent: May 27, 2008

(54) DATA TRANSMITTING APPARATUS, DATA RECEIVING APPARATUS, DATA TRANSMISSION SYSTEM AND DATA TRANSMISSION METHOD

(75) Inventors: Hideyuki Kuwano, Hirakata (JP); Hiroyuki Iitsuka, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 866 days.

(21) Appl. No.: 10/446,019

(22) Filed: May 28, 2003

(65) Prior Publication Data

US 2003/0226011 A1 Dec. 4, 2003

(30) Foreign Application Priority Data

May 29, 2002 (JP) ............................. 2002-156428

(51) Int. Cl.
*H04L 9/00* (2006.01)
*H04K 1/00* (2006.01)
*G06F 11/30* (2006.01)
*H04L 9/08* (2006.01)
*H04L 9/36* (2006.01)

(52) U.S. Cl. ...................... 713/155; 713/160; 713/168; 713/194; 705/57; 380/255

(58) Field of Classification Search ................ 713/155, 713/160, 168, 194; 705/57; 380/201, 255
See application file for complete search history.

(56) References Cited

U.S. PATENT DOCUMENTS 5,948,136 A 9/1999 Smyers 6,061,794 A 5/2000 Angelo et al.
6,526,144 B2* 2/2003 Markandey et al. ........ 713/160
2003/0084291 A1* 5/2003 Yamamoto et al. ......... 713/168

FOREIGN PATENT DOCUMENTS

EP 0 913 975 5/1999

(Continued)

OTHER PUBLICATIONS

English Translation for JP 2006333095 A has been provided, Dec. 19, 2007, pp. 1-31.*

(Continued)

*Primary Examiner*—Matthew Smithers
*Assistant Examiner*—Courtney D Fields
(74) *Attorney, Agent, or Firm*—Wenderoth, Lind & Ponack, L.L.P.

(57) ABSTRACT

A Controller 20 sends to a Consumer 40 a command for reserving a plug/port in order to send/receive data using an Asynchronous transmission (Step 211) and receives information on a port connecting from the Consumer 40 (Step 212). The Controller 20 further sends to a Producer 30 a command for reserving a port/plug for sending content or the like (Step 213) and receives from the Producer 30 information on a Producer plug/port used for transmission (Step 214). After this, the Controller 20 notifies the Consumer 40 of the information on the port of the Producer 30 (Step 215) and receives a response from the Consumer 40 (Step 216). Next, the Consumer 40 issues a device authentication request command to the Producer 30 (Step 219) and they perform mutual device authentication and exchange of keys (Step 217).

46 Claims, 24 Drawing Sheets

FOREIGN PATENT DOCUMENTS

| | | |
|---|---|---|
| EP | 0 978 965 | 2/2000 |
| EP | 1 191 736 | 3/2002 |
| JP | 11-205310 | 7/1999 |
| JP | 2002-009754 | 1/2002 |
| JP | 2006333095 A * | 12/2006 |

OTHER PUBLICATIONS

Geoffrey Engerman, Lee Kearney, "Effective Use of Wireless Data Communications", Feb. 1998, International Journal of Network Management, vol. 8, Issue 1, pp. 2-11.*

* cited by examiner

Structure of Isochronous Packet

Structure of Asynchronous Packet

Structure of iAPR register

Structure of oAPR register

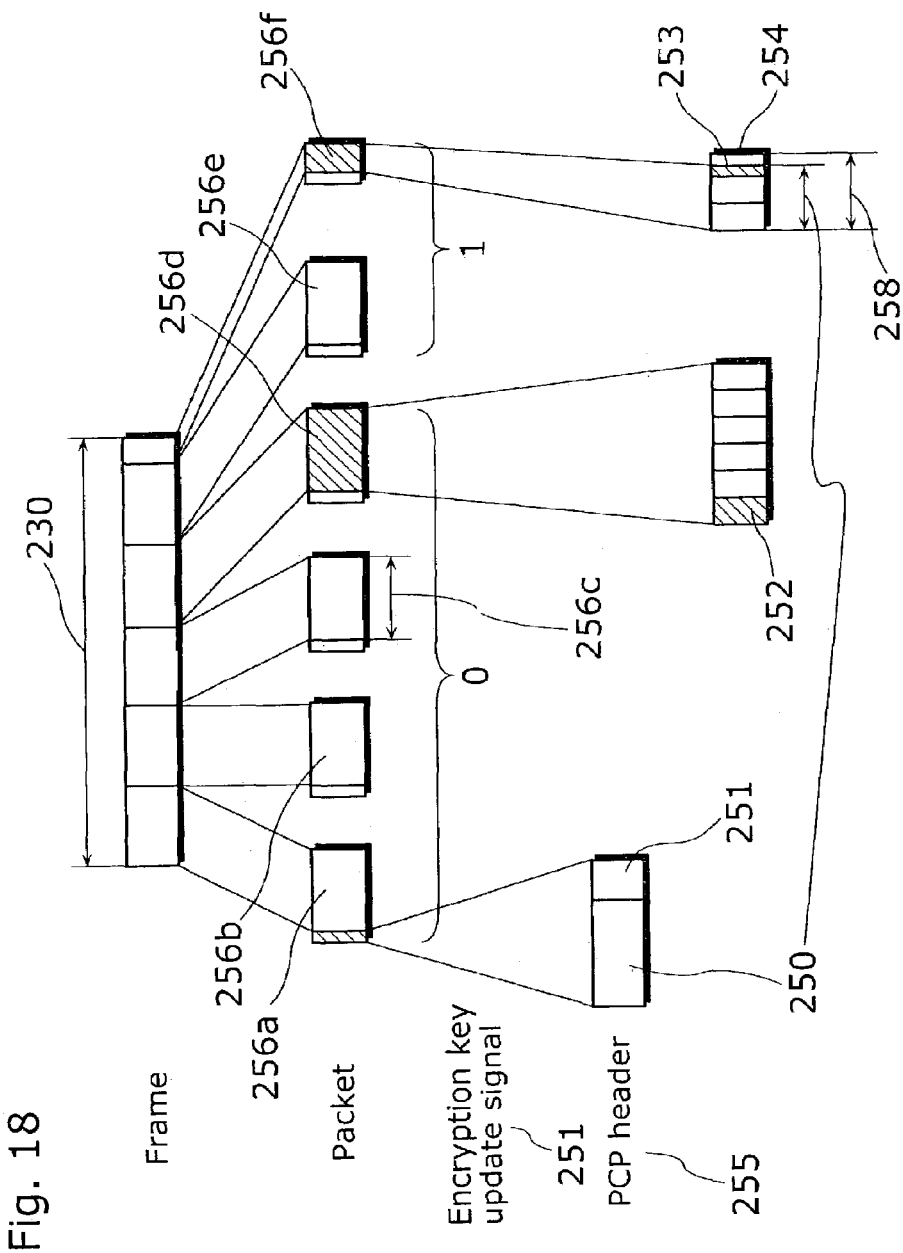

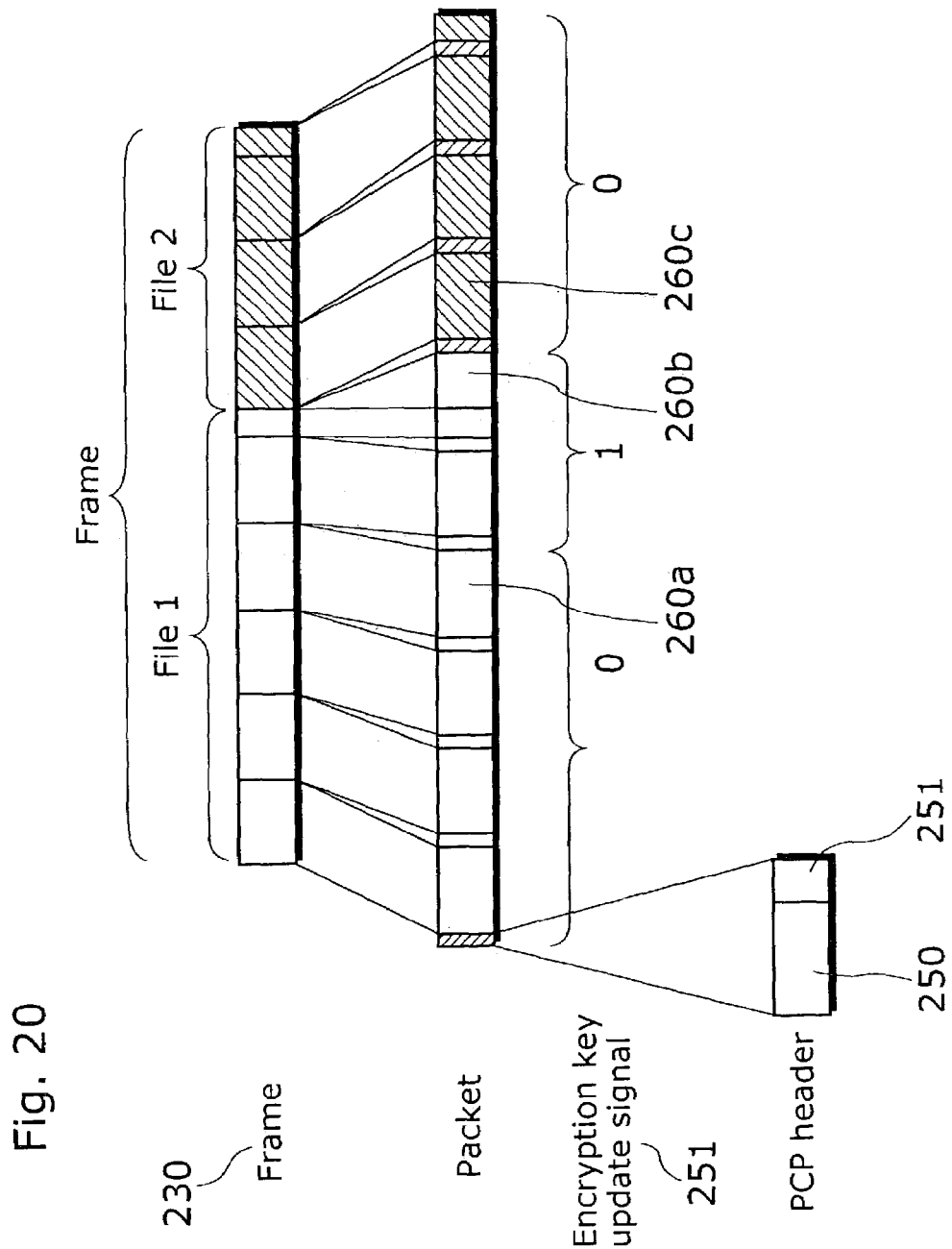

DATA TRANSMITTING APPARATUS, DATA RECEIVING APPARATUS, DATA TRANSMISSION SYSTEM AND DATA TRANSMISSION METHOD

TECHNICAL FIELD

The present invention relates to a data transmitting apparatus and a data receiving apparatus involving a sending and receiving of digital data such as video content and audio content as well as a data transmission method and a data transmission system, especially to a technique of copyright protection for the video content and other content in data transmission.

BACKGROUND ART

A conventional transmission method of digital data includes a data transmission method based on IEEE1394 (IEEE1394-1995, Standard for a High Performance Serial Bus) serial bus interface standard (hereafter referred to as "IEEE1394"). As for a communication using this data transmission method, two types of communications exist: an Isochronous communication suitable for a data transmission in which it is required to keep a data transmission rate constant as in a case of sending video signals and audio signals or the like; and an Asynchronous communication for a data transmission in which it is required to communicate without fail and it does not matter whether the data transmission rate is constant or not as in a case of sending control signals or the like. It is also possible to mix a single unit of data of the both types of communications in the bus IEEE1394.

Here, a brief summary of the IEEE1394, the Isochronous communication and the Asynchronous communication follows.

FIG. 1 is a diagram showing an AV (Audio Visual) protocol stack when the IEEE1394 is used for transmitting digital video signals and digital audio signals. As is shown in FIG. 1, the IEEE1394 is defined as a protocol of a lower layer. Various types of protocols are suggested as a protocol of an upper layer using the lower layer, for example, SBP-2 designed to efficiently transmit a SCSI protocol in the IEEE1394, IP over 1394 for transmitting datagram of IPv4 in the IEEE1394 being conscious of a network and an AV protocol (IEEE 61883) which is conscious of a real-time data transmission like AV information. An AV protocol 102, above all, mounted with many of the digital AV apparatuses, plays the role of an engine for the diffusion of the IEEE1394.

The AV protocol 102 is a protocol mainly aiming at transmitting real-time data such as video and audio using Isochronous packet. The AV protocol 102 consists of three elements: a real-time data transmission 103, a signal transmission procedure 104 and a control signal 105.

The real-time data transmission 103 defines additional information and a method of packetization that are necessary for storing data in various formats into the Isochronous packet and transmitting it via IEEE1394. The signal transmission procedure 104 defines a procedure for establishing an input/output path between apparatuses for exchanging data using the Isochronous packet for the apparatuses connected via the IEEE1394. In this case, a virtual transmission path is established between the apparatuses by using a concept of "plug". The control signal 105 defines a control signal for controlling the operations of the apparatuses connected via the IEEE1394. This control signal is transmitted via Asynchronous packet.

As is described above, the concept of "plug" is provided as the signal transmission procedure 104 for establishing a logical signal connection in the AV protocol 102. The plug is a virtual concept and has an input plug and an output plug. The aforementioned apparatuses can have a plurality of input plugs and output plugs irrelevantly to physical connectors. To control a signal path by connecting the input plug and the output plug to a data channel is called a connection management.

The following describes a summary of the Isochronous communication and the Asynchronous communication.

FIG. 2 is a packet block diagram of the Isochronous packet in the Isochronous communication. In the Isochronous communication, a data transmission is carried out using the unit of Isochronous packet in FIG. 2. The data size of the Isochronous packet differs according to the transmission rate. The sending side does not transmit data to a specified node but transmits a packet to all the nodes on the bus using channel numbers 0~63. A receiving node reads the data by selecting a packet of a channel number which it desires to receive. Therefore, it shall be necessary for the sending node and the receiving node to mutually recognize beforehand the channel numbers to be used in the Isochronous communication between the specified nodes.

FIG. 3 is a packet block diagram of the Asynchronous packet in the Asynchronous communication. In the Asynchronous communication, data transmission is carried out using the unit of Asynchronous packet as shown in FIG. 3. The maximum data size of this packet (the maximum payload length) is defined within a range of 512 [bytes] to 4096 [bytes] according to the transmission rate. There are three types of transactions (processing) of "Read" "Write" and "Lock" in the Asynchronous communication. The Read transaction reads out data of a predetermined data length from a target address of the partner node. The Write transaction writes the data of the predetermined data length to the target address of the partner node. The Lock transaction writes the data of the predetermined data length to the target address of the partner node with conditions. The Read transaction and the Write transaction are used mainly for data transmission whereas the Lock transaction is used principally for sending commands or the like.

The following describes a communication sequence in a conventional Asynchronous communication with reference to FIG. 4.

Firstly, a Controller 120 sends an "ALLOCATE command" to a Consumer 140 and reserves a receiving plug of the Consumer 140 (Step 101). The Consumer 140, receiving the "ALLOCATE command", reserves the plug and sends back an "ACCEPTED response" to the Controller 120 (Step 102).

Next, the Controller 120, receiving the "ACCEPTED response" from the Consumer 140, sends an "ALLOCATE_ATTACH command" to a Producer 130 (Step 103).

Consequently, the Producer 130 connects a Producer port and sends back the "ACCEPTED response" to the Controller 120 (Step 104). The Controller 120, receiving the "ACCEPTED response" from the Producer 130, sends the "ATTACH command" to the Consumer 140 (Step 105). The Consumer 140, receiving the "ATTACH command", connects a Consumer port and sends back the "ACCEPTED response" to the Producer 130 (Step 106). With the above processing, an Asynchronous Connection is established, and the data transmission is realized (Step 107).

As described before, the Isochronous communication of the real-time data transmission 103 is a data communication method of broadband type which does not specify a receiving apparatus, and all the apparatuses connected to the IEEE1394 can refer to the data in the bus. As for the video data and the audio data, however, there are cases where it is necessary to protect the copyright.

With that, 5CDTCP (Five Company Digital Transmission Content Protection) (hereafter accordingly referred to as DTCP) has been established as a system to protect digital content sent and received between the apparatuses connected via the IEEE1394. The DTCP authenticates in advance whether processing of encryption/decryption can be handled correctly between a sending apparatus and a receiving apparatus so as to send and receive the data by encrypting the digital content using a method that is available only for the sending apparatus and the receiving apparatus when the digital content with the copy restriction is sent and received.

The following describes a protecting method for contents under the DTCP based on the IEEE1394 with reference to FIG. 5.

FIG. 5 is a schematic diagram of a communication sequence regarding a device authentication and an exchange of encryption keys. The DTCP with the use of the IEEE1394 is defined with an assumption that the data transmission (hereafter referred to as "Isochronous transmission") is carried out using the Isochronous packet. A data receiving apparatus becomes capable of receiving data from the time when it is connected to the bus and the data is transmitted to the bus since the Isochronous transmission is a broadband type transmission method as mentioned before.

As shown in FIG. 5, when the digital content with a copy restriction is sent with the Isochronous transmission method under the DTCP, firstly a Sink 140, the receiving side, issues a device authentication request to a Source 130, the sending side (Step 121). In this case, the Sink 140 sends a parameter of the receiving side towards the Source 130. The Source 130 sends a parameter of the sending side to the Sink 140 when the received parameter is correct. On the contrary, the Source 130 sends a notification which aims at rejecting the data transmission when the received parameter is not correct. A shared authentication key is calculated respectively when the parameters are exchanged between the sending side and the receiving side (Steps 123 and 126). The Source 130 encrypts an encryption key for encrypting the content using the calculated authentication key when the calculation of the authentication key is terminated (Step 124) and sends the encrypted key to the Sink 140 (Step 125). The side of the Sink 140 decrypts the received encryption key based on the calculated authentication key (Step 127). The Source 130 encrypts the content using the encryption key and sends the encrypted content (Step 129) whereas the Sink 140 decrypts the received encrypted content (Step 130). In this way, the protection of the content or the like at the time of transmission is operated in the conventional Isochronous transmission.

As described above, in the case of using the IEEE1394, the protection for the content under the DTCP presupposes that the Isochronous transmission is employed and thereby nothing is defined for the Asynchronous transmission. For the Isochronous transmission, an aim is to send the content in which a copyright of mainly a video stream and audio data is emphasized, whereas the Asynchronous transmission requires a cumbersome control procedure and a processing speed becomes low when commands and the data stored in an external storage are encrypted at the time of transmission. Also, due to a specified node ID defined for the transmission, the specification in which an apparatus other than the one with the specified node ID cannot receive the data can be considered as one of the reasons for the low processing speed.

However, recently, there has been an increase in the number of occasions to handle still picture data with which an industrial design of a content creator such as PDF (Portable Document Format, a trademark of Adobe) can be recreated and also the still picture data with which a problem of rights of portrait becomes an issue as with an object such as high quality image data. Therefore, a content protection for such data is necessary. It is conceivable that a malicious apparatus located somewhere in the bus lies about its own node ID so as to exploit data unless the data protection is performed.

Consequently, there arises the case in which a data protection for the transmission is necessary even for the data to be transmitted preferably by Asynchronous transmission rather than Isochronous transmission. As for the protecting method, taking into consideration the fact that many AV apparatuses having the IEEE1394 bus are available on the market, it is desirable that the transmission method needs a relatively little modification and is efficient at the same time. Namely, a transmission method that can realize an Asynchronous transmission taking over the content protection method of the DTCP realized with the Isochronous transmission is desired.

Also, an application of the DTCP to USB (DTCP Volume 1 Supplement A Informational Version/Mapping DTCP to USB) is standardized as an example of applying the content protection method of the DTCP to the asynchronous transmission. Furthermore, as is published in Japanese Laid-Open Patent Application 2001-333130, a method of converting the IEEE1394 into the USB is suggested. However, in the case of the USB, different from that of the IEEE1394, a function sharing between a host apparatus and peripheral apparatuses is provided, and it is the host apparatus who manages all the controls of the apparatuses being connected. For example, when a printer is connected to a personal computer, the personal computer controls the peripheral apparatuses via software known as a driver which performs a control specific to each apparatus. In this case, the driver handles the control of the peripheral apparatuses on a one-to-one basis because each peripheral apparatus maker provides a driver uniquely.

However, in a case of using an AV apparatus, such as a digital TV, that is different from a personal computer, it is difficult to perform a control specific to each peripheral apparatus with the use of a driver. Therefore, it is desirable to apply the data transmission utilizing the IEEE1394 interface which has versatility, for instance, in the case of connecting the AV apparatus to a printer.

Nevertheless, there are several challenges in appropriating the cryptographic protocol of the DTCP defined in the Isochronous transmission with the use of the IEEE1394 directly for the Asynchronous transmission.

Firstly, in the case of Isochronous transmission, the encryption key shall be updated regularly every 30 seconds to 2 minutes, and information on the changing timing is stored in an O/E (Odd/Even) field 141 which is a head part of the Isochronous packet as shown in FIG. 2. Therefore, there is no chance that the changing timing at the sending side and the receiving side mismatch even though the time of changing the encryption keys are not completely at regular intervals. In the Asynchronous transmission, however, a free space for a flag to notify the change of the encryption keys does not exist in the data packet as shown in FIG. 3. What is more, the part corresponding to the O/E field 141 is not defined.

Furthermore, in the case of Asynchronous transmission, time and amount of data transmission are not in a proportional relationship, which is different from the Isochronous transmission, and the transmission of enormous amount of data with a fixed transmission rate is not assured. This means that the data transmitted within a certain time under the Isochronous transmission has a specified amount whereas this is not assured in the case of Asynchronous transmission. The size of the data to be transmitted differs according to the content or the like. Therefore, in the case of changing the encryption keys, it is necessary that the sending side and the receiving side recognize with which timing the encryption keys should be changed.

In the case of Isochronous transmission, a unit used for encryption is defined one-sidedly according to the content to be sent. The unit used for encryption is determined according to the data transmission rate of respective contents. In the Asynchronous transmission, however, the transmission rate has no meaning and the amount of the data to be transmitted varies greatly. Therefore, there are no criteria for a unit that is the most suitable for encryption, and it can be set freely between 8 bytes and 1023 bytes in the case of applying the DTCP to the USB. In the case of using a personal computer which mainly utilizes the USB, a type of apparatus for the receiving side may be registered beforehand to the sending side, as described above. However, as for an AV apparatus with which the IEEE1394 is mainly used, it is not allowed to take the required steps to register a parameter according to the apparatus being connected. Consequently, there is a need for the sending side and the receiving side to share a unit of encryption in one way or another.

For the above reasons, a solution different from the case of Isochronous transmission is required in order to apply the DTCP method to the IEEE1394 Asynchronous communication.

The present invention therefore takes the above challenges into consideration and aims to provide a data transmission system that allows a copyright protection of contents in the conventional Asynchronous transmission employing the IEEE1394.

SUMMARY OF THE INVENTION

In order to achieve the above object, a data transmitting apparatus according to the present invention is a data transmitting apparatus for transmitting data to a data receiving apparatus via a communication interface using an asynchronous communication method and comprises a connection establishment unit operable to establish a logical transmission path between the data transmitting apparatus and the data receiving apparatus by exchanging information with the data receiving apparatus; a device authentication unit operable to perform a device authentication for the data receiving apparatus (i) before the logical transmission path is established, (ii) in process of establishing the logical transmission path, or (iii) after the logical transmission path is established; an encryption key sharing unit operable to generate an encryption key based on a result of the device authentication performed by the device authentication unit and allow shared use of the generated encryption key between the data transmitting apparatus and the data receiving apparatus; and a data transmission unit operable to encrypt the data using the shared encryption key and transmit the encrypted data to the data receiving apparatus.

Thus, an encryption is performed using another encryption key when the next connection is established in case that the encryption key is exploited since the mutual device authentication is performed before and after a connection to a receiving side is established or in process of the establishing the connection, and at the same time, the encryption of the data is performed using an encryption key generated and shared based on the result of the authentication. Therefore, it is possible to protect the content from an unauthorized apparatus, for example, in an IEEE1394 Asynchronous transmission.

In order to achieve the above object, a data receiving apparatus according to the present invention is a data receiving apparatus for receiving data from a data transmitting apparatus via a communication interface using an asynchronous communication method and comprises the following units: a connection establishment unit operable to establish a logical transmission path between the data transmitting apparatus and the data receiving apparatus by exchanging information with the data transmitting apparatus; a device authentication unit operable to perform a device authentication so that the data transmitting apparatus may authenticate the data receiving apparatus (i) before the logical transmission path is established, (ii) in process of establishing the logical transmission path, or (iii) after the logical transmission path is established; an encryption key sharing unit operable to generate an encryption key based on the result of the device authentication performed by the device authentication unit and allow shared use of the generated encryption key between the data transmitting apparatus and the data receiving apparatus; and a data reception unit operable to receive the data transmitted from the data transmitting apparatus and decrypt the received data using the encryption key made sharable by the encryption key sharing unit.

Consequently, an encryption is performed using another encryption key when the next connection is established in case the encryption key is exploited since the mutual device authentication is performed before/after a connection with a sending side is established or in process of establishing the connection, and at the same time, the encryption of the data is performed using the encryption key generated and shared based on the result of the authentication.

The present invention can be realized as a data transmission method and a data reception method having the characteristic composing units of the data transmitting apparatus and the data receiving apparatus as steps in order to achieve the above-mentioned object. Also, the present invention can be realized as a data transmission system consisting of the data transmitting apparatus and the data receiving apparatus in order to achieve the above-mentioned object.

As for the further information about the technical background to this application, Japanese Patent Application No. 2002-156428 filed May 29, 2002, is incorporated herein by reference.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 18 is a block diagram of data when a frame is divided into several packets according to a fourth embodiment.

FIG. 20 is a schematic diagram showing a packet structure within a frame according to a fifth embodiment.

BEST MODE FOR CARRYING OUT THE INVENTION

The following describes embodiments according to the present invention with reference to the attached drawings.

First Embodiment

Figure 6:
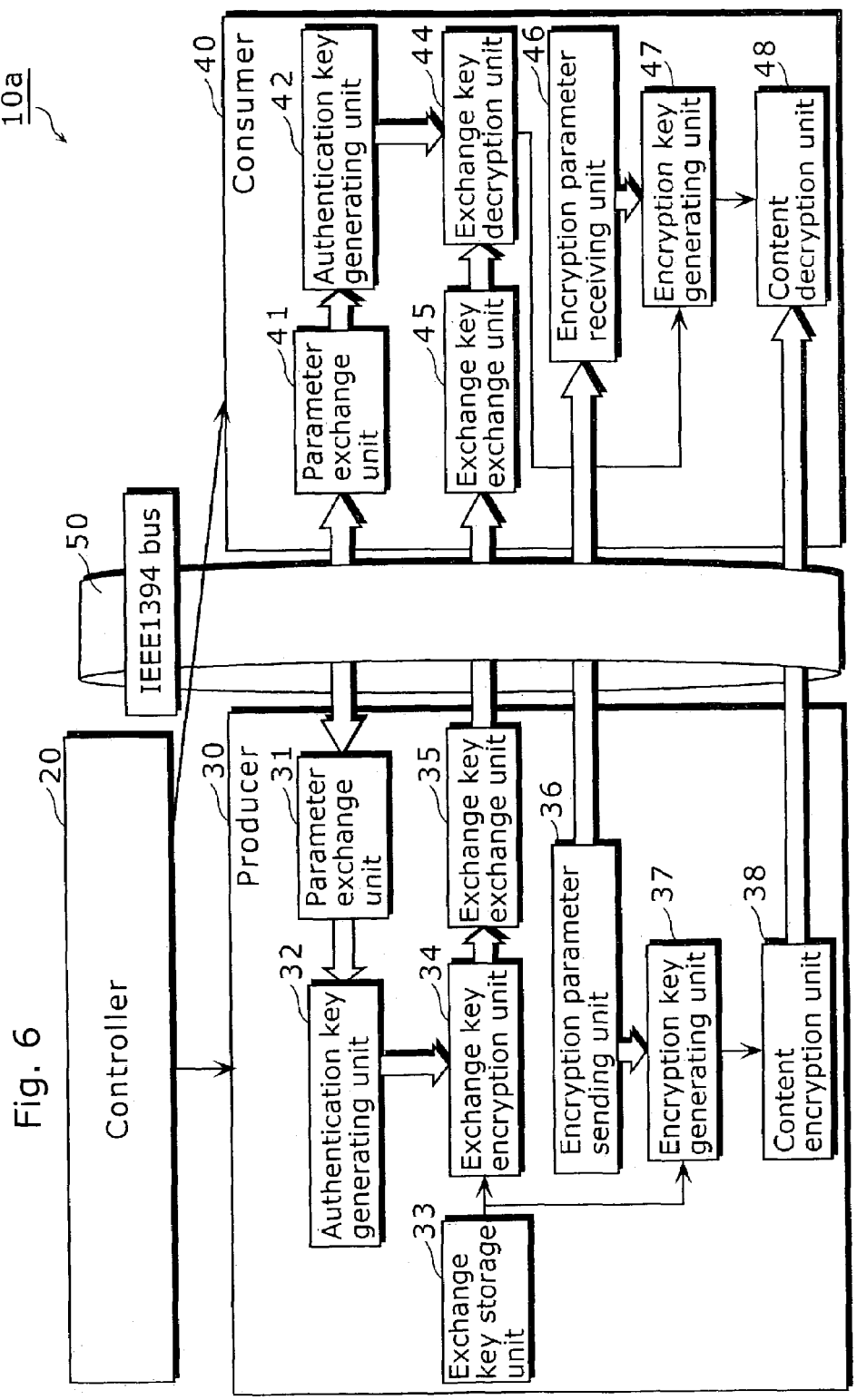
FIG. 6 is a block diagram showing a whole function structure of a data transmission system according to a first embodiment.

FIG. 6 is a block diagram showing a whole function structure of a data transmission system 10a according to the present invention. The data transmission system 10a is a system realizing a transmission (also known as a "transfer") of contents such as video and audio via a specified bus interface such as an IEEE1394 or the like with an arbitrary timing (for instance, with instructions from an operator) as well as a copyright protection of the contents in doing so. The data transmission system 10a is a system in which a Producer 30 transmits the encrypted contents to a Consumer 40 using an asynchronous transmission via an IEEE1394 bus 50 according to the controls performed by a Controller 20.

The Controller 20 is a control apparatus managing a connection (namely establishment and release of a logical transmission path) between the Producer 30, a data transmitting apparatus, and the Consumer 40, a data receiving apparatus. To cite a concrete example of the Controller 20, the Producer 30 and the Consumer 40, a combination of a STB (Set Top Box) for digital broadcasting having the functions of the Controller 20 and the Producer 30, and a video printer equivalent to the Consumer 40 falls under the category. The data transmission system 10a also performs a copyright protection when a video of high quality digital broadcasting or the like is outputted to the video printer.

The Producer 30 is an apparatus for transmitting content or the like to the Consumer 40 using an Asynchronous packet via the IEEE1394 bus 50 and includes a parameter exchange unit 31, an authentication key generating unit 32, an exchange key memory unit 33, an exchange key encryption unit 34, an exchange key exchange unit 35, an encryption parameter sending unit 36, an encryption key generating unit 37 and a content encryption unit 38 or the like.

The parameter exchange unit 31 exchanges parameters for generating an authentication key with the parameter exchange unit 41 of the Consumer 40 and sends it to the authentication key generating unit 32. The authentication key generating unit 32 generates an authentication key for authenticating the Consumer 40 based on the parameter received from the parameter exchange unit 31 and sends it to the exchange key encryption unit 34. The exchange key memory unit 33 is, for instance, a RAM or the like and records beforehand an exchange key (alternatively, an exchange key may be created by an occurrence of random numbers based on an initial entry being stored). The exchange key encryption unit 34 reads out the exchange key from the exchange key memory unit 33, encrypts it with the received authentication key and sends it to the exchange key exchange unit 35.

The exchange key exchange unit 35 exchanges the exchange keys with the exchange key exchange unit 45 of the Consumer 40. The encryption parameter sending unit 36 sends a parameter to the encryption key generating unit 37 and the encryption parameter receiving unit 46 of the Consumer 40 for generating an encryption key. The encryption key generating unit 37 generates an encryption key based on the received encryption parameter. The content encryption unit 38 encrypts the content with the encryption key generated by the encryption key generating unit 37 and sends the encrypted content to the Consumer 40 via the IEEE1394 bus 50.

The Consumer 40 is an apparatus for receiving content or the like through an Asynchronous packet from the Producer 30 via the IEEE1394 bus 50 and includes a parameter exchange unit 41, an authentication key generating unit 42, an exchange key decryption unit 44, an exchange key exchange unit 45, an encryption parameter receiving unit 46, an encryption key generating unit 47 and a content decryption unit 48.

The parameter exchange unit 41 exchanges parameters for generating an authentication key with the parameter exchange unit 31 of the Producer 30 and sends it to the authentication key generating unit 42. The authentication key generating unit 42 generates an authentication key for authenticating the Producer 30 based on the parameter received from the parameter exchange unit 41 and sends it to the exchange key decryption unit 44. The exchange key decryption unit 44 decrypts an exchange key received from the exchange key exchange unit 35 via the exchange key exchange unit 45 using the authentication key received from the authentication key generating unit 42 and sends it to the encryption key generating unit 47.

The exchange key exchange unit 45 receives the exchange key from the exchange key exchange unit 35 of the Producer 30. The encryption parameter receiving unit 46 receives a parameter for generating an encryption key from the encryption parameter sending unit 36 of the Producer 30 and sends it to the encryption key generating unit 47. The encryption key generating unit 47 generates an encryption key based on the exchange key received from the exchange key decryption unit 44 and the parameter received from the encryption parameter receiving unit 46 and sends it to the content decryption unit 48. The content decryption unit 48 decrypts the content received from the Producer 30 with the encryption key received from the encryption key generating unit 47.

Figure 7:
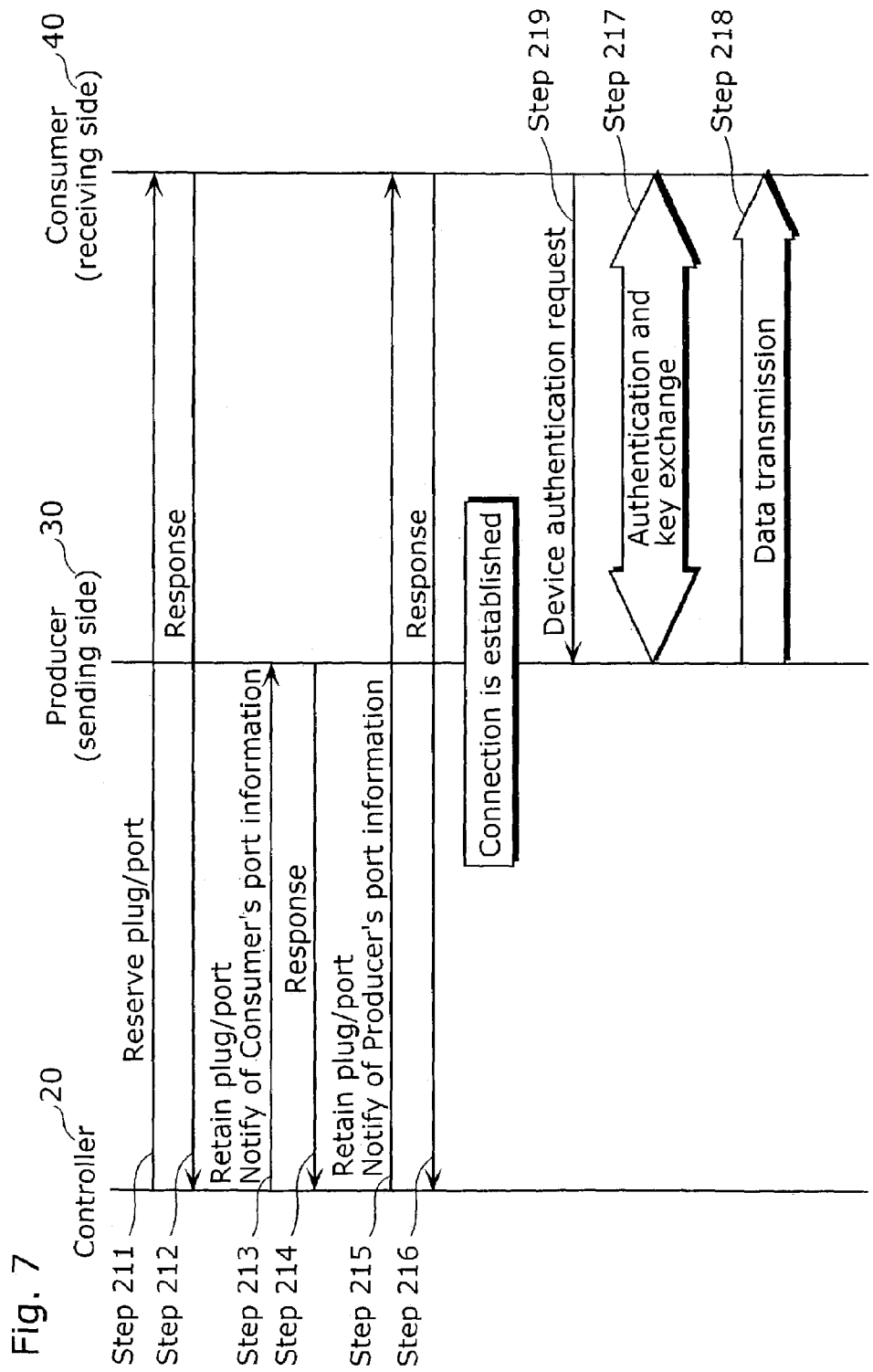
FIG. 7 is a communication sequence diagram for establishing a connection in order to perform an Asynchronous transmission according to the first embodiment.

FIG. 7 is a communication sequence diagram for establishing a connection in order to perform the Asynchronous transmission.

Firstly, the Controller 20 sends to the Consumer 40 an "ALLOCATE command" for reserving a plug/port in order to send and receive data by Asynchronous transmission (Step 211). The Consumer 40, receiving the "ALLOCATE command", reserves the plug/port and sends back information on the port to be connected together with an "ACCEPTED response" to the Controller 20 (Step 212).

Next, the Controller 20, receiving the "ACCEPTED response", judges that the Consumer 40 can receive the content or the like and sends an "ALLOCATE_ATTACH command" to retain a port/plug for transmission in order to send the content or the like by Asynchronous transmission (Step 213).

In this case, the Controller 20 notifies the Producer 30 of the information on the port connected at the Consumer 40. The Producer 30, receiving the "ALLOCATE_ATTACH command", retains a Producer plug/port for transmission and sends back the "ACCEPTED response" to the Controller 20 (Step 214).

After that, the Controller 20 sends the "ATTACH command" to the Consumer 40 (Step 215). Here, the Controller 20 notifies the Consumer 40 of the information on the port of the Producer 30 (Step 215). The Consumer 40, receiving the "ATTACH command", connects a Consumer port and sends back an "ACCEPTED response" (Step 216).

With the sequence above, an Asynchronous Connection is established. Then, the Consumer 40 issues a device authentication request command to the Producer 30 (Step 219). The Producer 30 then can tell whether the Consumer 40 corresponds to a DTCP method or not by starting up a timer to measure the time for receiving the device authentication request command from the Consumer 40 after the Asynchronous Connection is established. For instance, when the device authentication request command is not issued from the Consumer 40 even after the establishment of the Asynchronous Connection and even though the Producer 30 requests the content data to be encrypted for data transmission, the Consumer 40 is regarded as not corresponding to the DTCP method and thereby the transmission of the content data is refused.

The data transmission is realized regardless of the device authentication request command unless the Producer 30 requests the content data to be particularly encrypted for data transmission. Meanwhile, the side of the Consumer 40 considers the Producer 30 as not corresponding to the DTCP method and thereby judges that the encrypted data is not going to be transmitted when a "Not Implemented" response is returned in spite of the issue of the device authentication request command.

Figure 5:
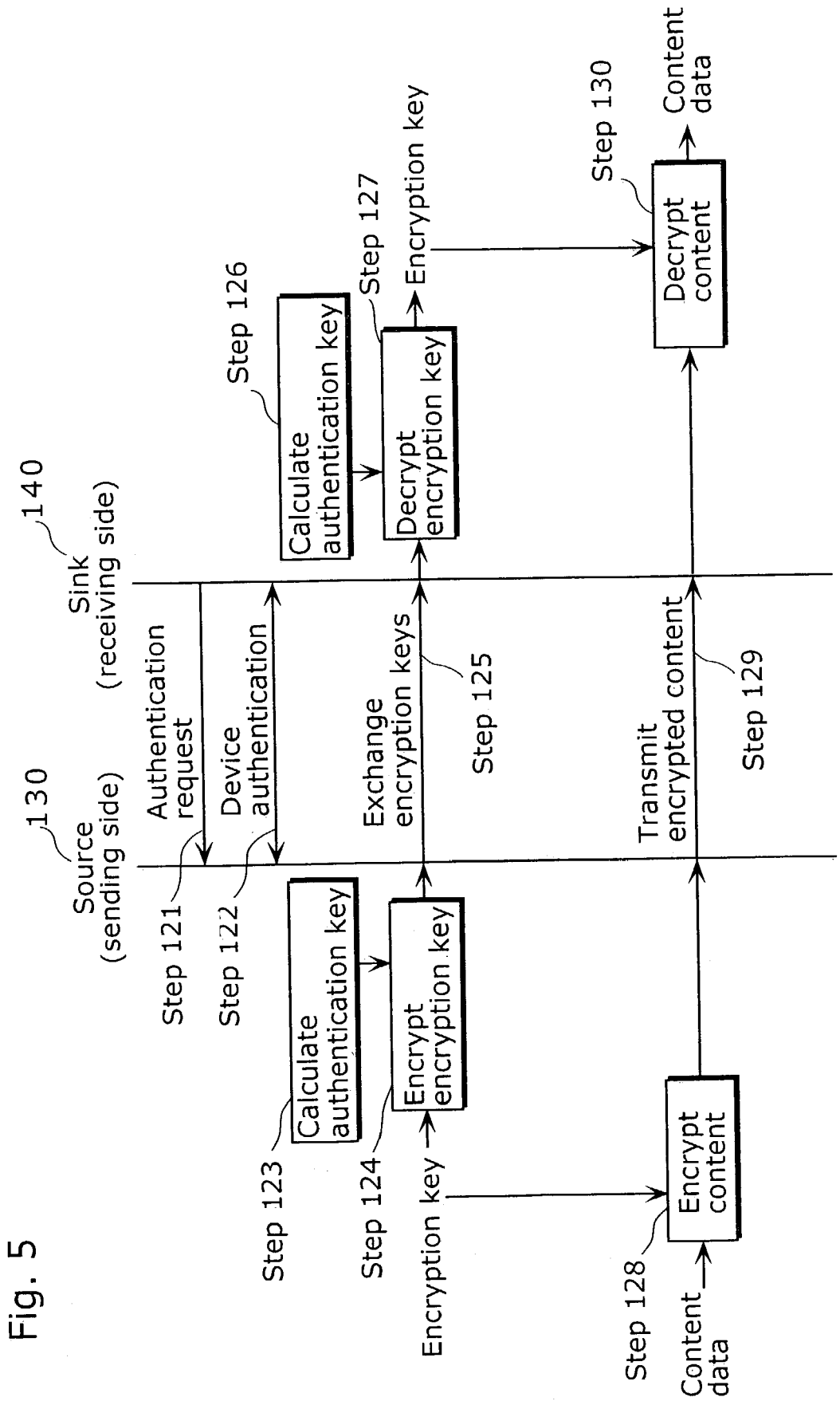
FIG. 5 is a schematic diagram of a communication sequence regarding conventional device authentication and exchange of encryption keys.

Processing of "authentication" and "key exchange" is performed for sending and receiving the encrypted content of the DCTP or the like between the Producer 30 and the Consumer 40 when the Asynchronous Connection is established with the Steps above (Step 217). The processing of "authentication" and "key exchange" is basically the same as what is described in FIG. 5; however, the resume is explained in the following with reference to FIG. 5.

First, the Consumer 40 (receiving side) informs the Producer 30 (sending side) of a parameter for authentication together with an authentication start request (Step 121). This parameter is generated using random numbers, and therefore, differs accordingly. The Producer 30, receiving the authentication start request from the Consumer 40, informs the Consumer 40 of the authentication parameter of the Producer 30 unless the Consumer 40 is an unauthorized apparatus. After completing respectively the device authentication (Step 122), the Consumer 40 and the Producer 30 calculate respectively an authentication key (Step 123, 126). A sequence of device authentication and key exchange called "AKE" is completed at this stage, which allows the data transmission.

Second Embodiment

An embodiment in which the Consumer 40 issues the authentication start request without any conditions after the establishment of the Asynchronous Connection is explained in the first embodiment; however, the present embodiment describes an embodiment in which the Producer 30 takes action to start authentication.

Figure 8:
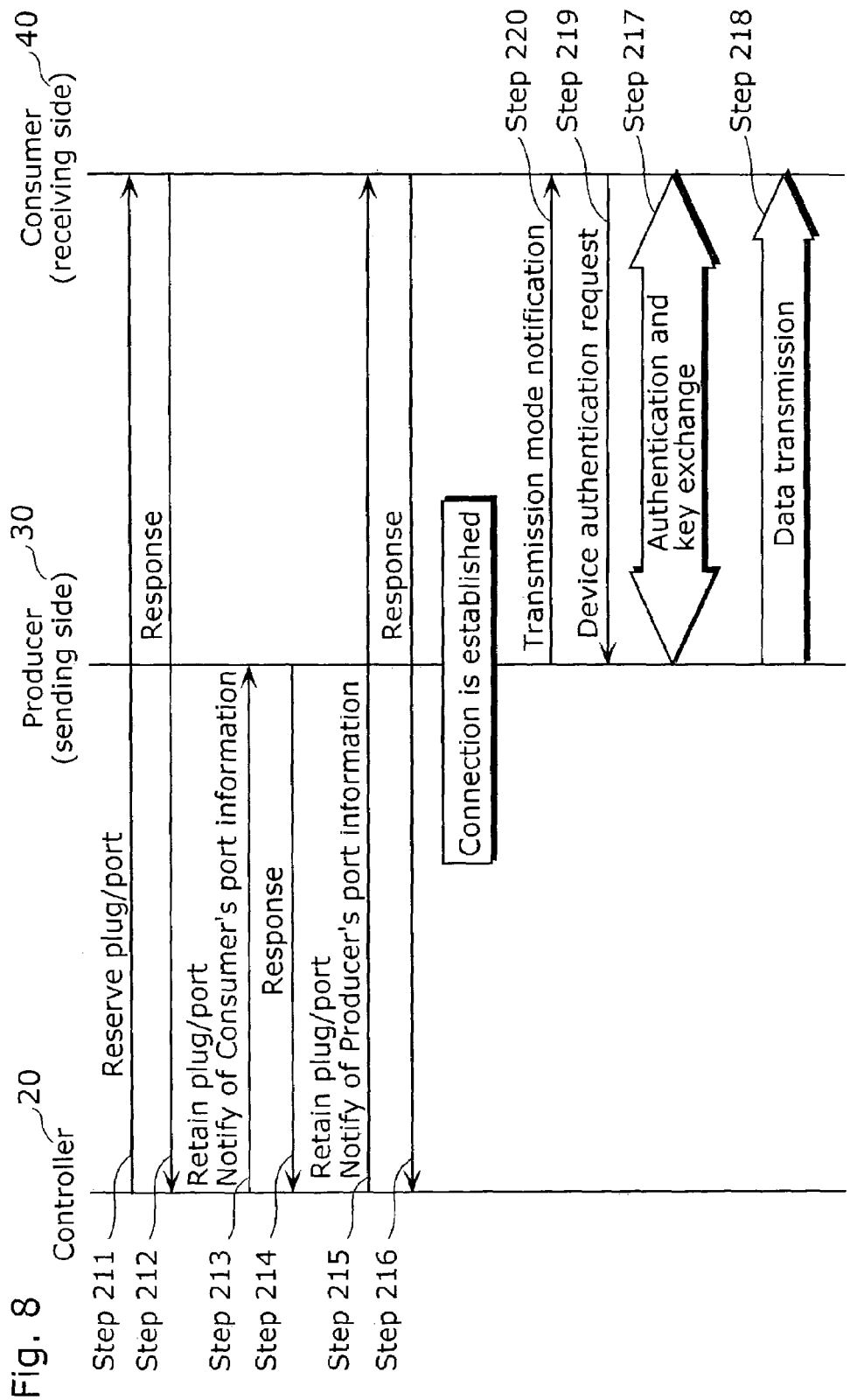
FIG. 8 is a communication sequence diagram for establishing a connection in order to perform the Asynchronous transmission according to a second embodiment.

FIG. 8 is a communication sequence diagram for establishing a connection in order to perform the Asynchronous transmission. The procedure to establish the Asynchronous Connection (Step 211~Step 216) is the same as in the first embodiment, therefore, the explanation is abbreviated.

The Producer 30 sends a transmission mode notice to the Consumer 40 at the stage when the Asynchronous Connection is established (Step 220). The transmission mode notice is used to inform the Consumer 40 whether to transmit the data transmitted by the Producer 30 with an encryption mode or a normal mode. This does not mean that the data must be encrypted for transmission when the encryption mode is active, and the data can be transmitted without being encrypted while the encryption mode is active.

The Consumer 40, receiving the transmission mode notice, issues a device authentication request command (Step 219). In this case, the Producer 30 judges that the Consumer 40 does not correspond to the DTCP method and performs a data transmission by normal mode when a "Not Implemented" response is sent back from the Consumer 40. The Producer 30 cancels the transmission of the content data when the content data is to be encrypted. However, the Producer 30 performs the data transmission by normal mode when the content data need not be encrypted in particular. When the "ACCEPTED response" is sent back from the Consumer 40, the encryption mode becomes active, and the processing of "authentication" and "key exchange" is performed in order to send and receive the encrypted content of the DTCP or the like between the Producer 30 and the Consumer 40 (Step 217).

On the other hand, the Consumer 40 judges that the data transmission is performed by normal mode and that the send data is not encrypted when the data transmission is started without any transmission mode notices sent from the Producer 30 (Step 220). Thus, a transmission of data can be performed without any problems even for the case in which the Producer 30 does not correspond to the DTCP method. As for the processing of "authentication" and "exchange key", the explanation is abbreviated as it is the same as in the first embodiment.

Third Embodiment

The first part of the processing (preprocessing) for sending and receiving the encrypted data is explained in the first and the second embodiments. The present embodiment describes processing of transmitting actual data from the Producer 30 (sending side) to the Consumer 40 (receiving side) after the establishment of the connection in the IEEE1394 Asynchronous communication.

Figure 9:
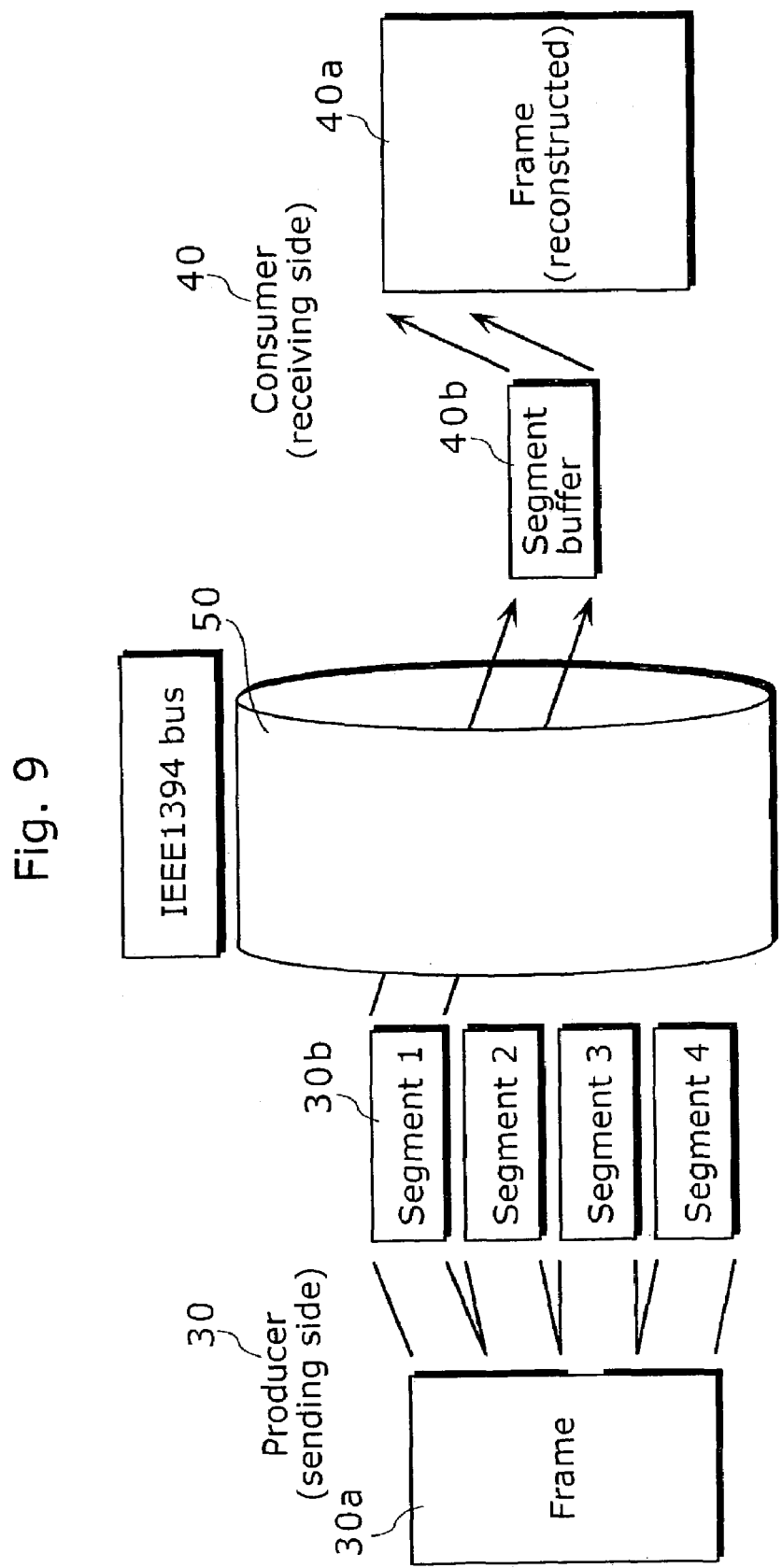
FIG. 9 is a conceptual diagram showing how a data transmission is operated in a commonly used IEEE1394 Asynchronous communication.

FIG. 9 is a conceptual diagram showing how a data transmission is operated in a commonly used IEEE1394 Asynchronous communication. Here, a set of data to be transmitted is called a "frame". The frame is divided into a unit called a "segment" according to the carrying capacities of the Producer 30 and the Consumer 40. Moreover, a register called "oAPR" (not shown in the diagram) for managing a Producer port is prepared for the Producer 30 whereas a register called "iAPR" (not shown in the diagram) for managing a Consumer port and a buffer (a segment buffer 40b) for receiving a segment are prepared for the Consumer 40.

As shown in FIG. 9, a frame 30a of the side of the Producer 30 is divided into a segment (one of them is a segment 30b), transmitted via the IEEE1394 bus 50 and stored in the segment buffer 40b of the side of the Consumer 40. On the side of the Consumer 40, a frame 40a is reconstructed using the data stored in the segment buffer 40b.

Figure 10:
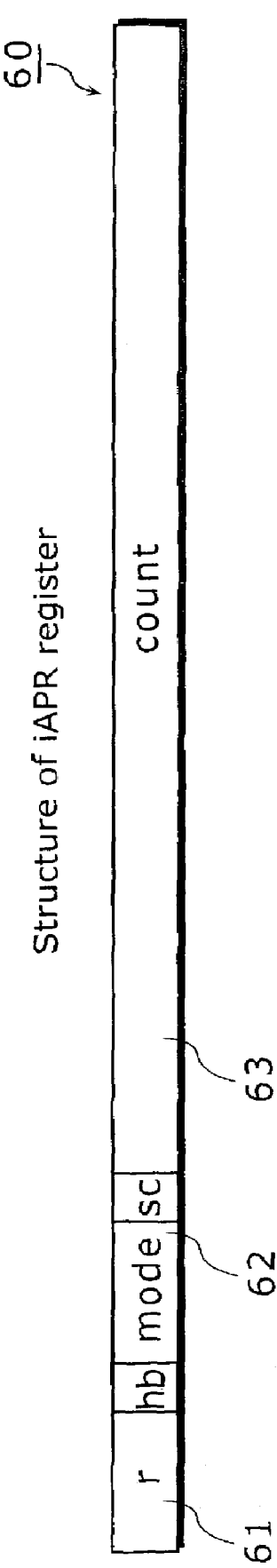
FIG. 10 is a diagram showing a structure of iAPR register.

FIG. 10 is a diagram showing a structure of an iAPR register 60. In the iAPR register 60, an r field 61 is an unused area. A mode field 62 is an area for notifying of a status of transmission ("MORE", for instance, shows that a transmission of a single segment is completed and that the subsequent segments exist. "LAST" shows that a transmission of a frame is completed.). A count field 63 is an area for notifying of the number of bytes for the data written in the segment buffer 40b.

Figure 11:
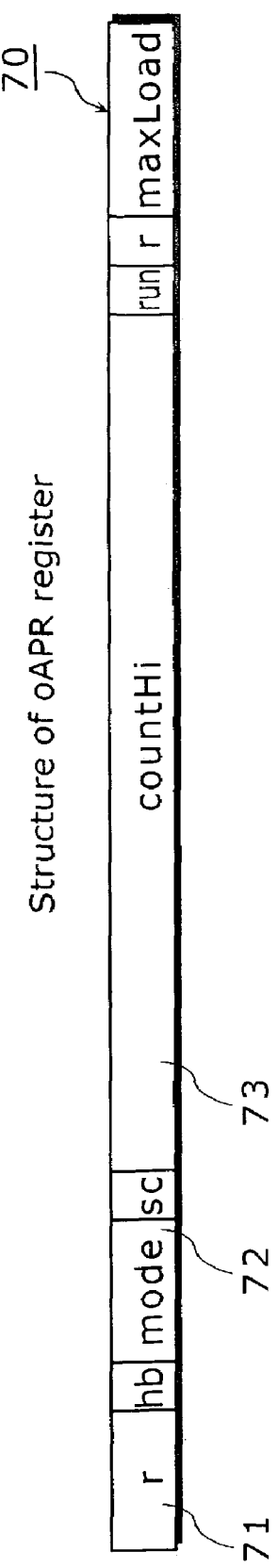
FIG. 11 is a diagram showing a structure of oAPR register.

FIG. 11 is a diagram showing a structure of an oAPR register 70. In the oAPR register 70, an r field 71 is an unused area. A mode field 72 is an area for notifying of a status of transmission ("SEND", for instance, presents a transmission request of the following segment). The count Hi field 73 is an area showing the number of bytes for the data written in the segment buffer 40b.

Figure 12:
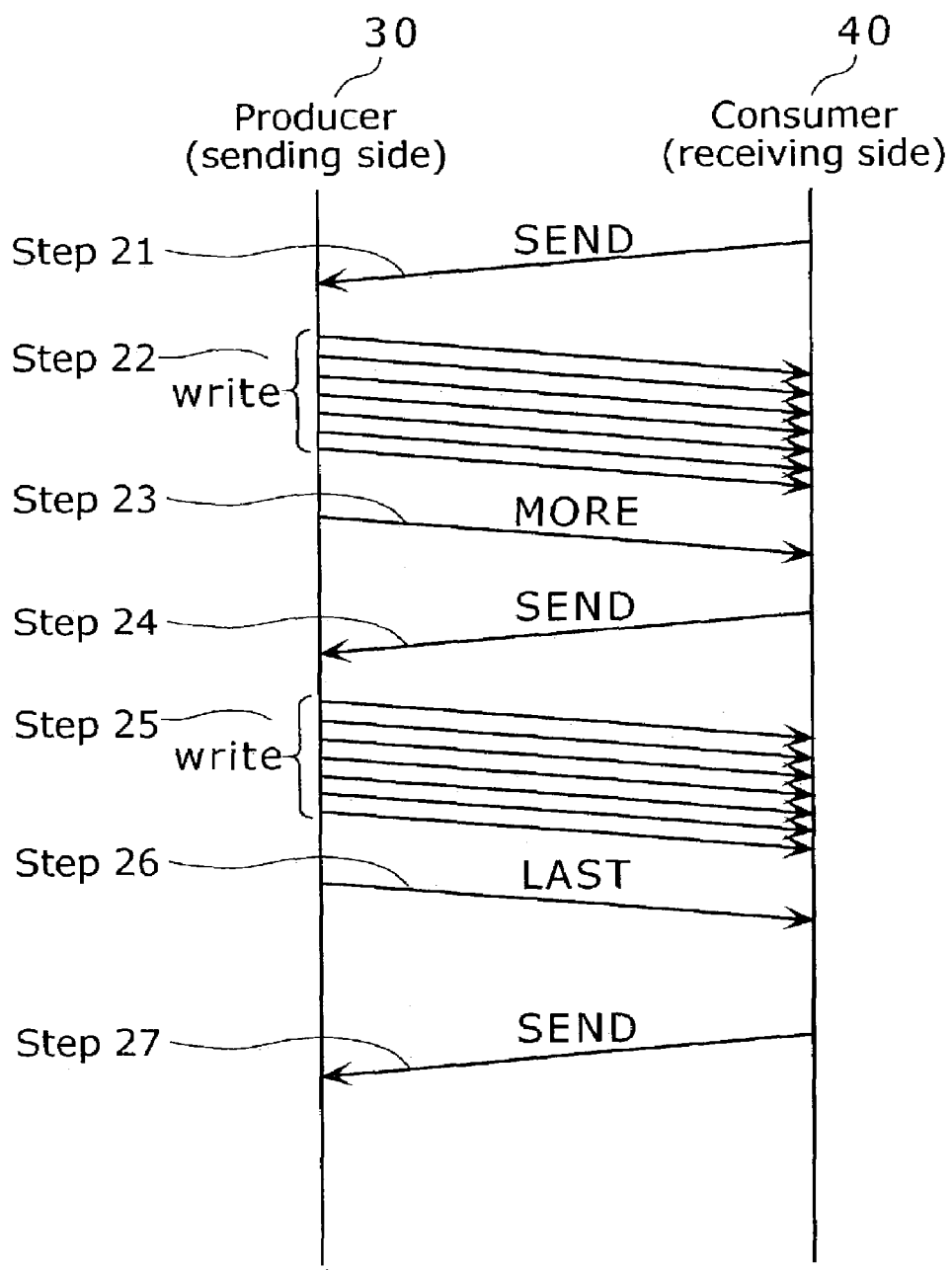
FIG. 12 is a communication sequence diagram showing how the data transmission is operated in the IEEE1394 Asynchronous communication.

FIG. 12 is a communication sequence diagram showing how a data transmission is operated in the IEEE1394 Asynchronous communication.

First, the Consumer 40, being ready to receive data, notifies in Lock transaction that a preparation to receive the data is completed (Step 21). This is realized when the Consumer 40 sets the mode field 72 in the oAPR register 70 of the Producer 30 as "SEND". At the same time, the data size of the segment buffer 40b available for the Consumer 40 can be notified of by the fact that the data size of the segment buffer 40b in the count Hi field 73 is written. The Producer 30 divides a frame 30a according to a specified amount of a segment buffer 40b and stores one by one starting from a segment 1 (30b) in the segment buffer 40b of the Consumer 40 in Write transaction. Since the size of the data to be transmitted in the Write transaction at a single time is defined by the data transmission rate in this case, the Write transaction is continued either until there is no data left to be transmitted or until a pulse duty factor of the segment buffer 40b is the maximum (Step 22). The Producer 30 informs the Consumer 40 that the transmission of the segment followed by the subsequent segments is completed when the pulse duty factor of the segment buffer 40b is the maximum. This is realized by the fact that the Producer 30 sets the mode field 62 in the iAPR register of the Consumer 40 as "MORE" (Step 23).

Next, the Consumer 40 sets again the mode field 72 in the oAPR register 70 of the Producer as "SEND" so as to notify that the preparation to receive the data is completed when the segment buffer 40b is processed to be in a ready state to receive the data (Step 24). The Producer 30 sets the mode field 62 in the iAPR register 60 of the Consumer 40 as "LAST" so as to notify that the transmission of the frame is completed when the same processing is repeated and no data is left to be transmitted (Step 25).

Lastly, the Controller 20, receiving a notice that the connection is no longer needed after the completion of the necessary data transmission, performs disconnect processing and releases the established connection. The encryption key is released at the same time. For newly establishing a connection for data transmission, an authentication key is generated by an authentication accordingly.

The above has described an example of the Asynchronous communication with the commonly used IEEE1394. The concept of "frame" in the present embodiment is almost the same as has been and presents a set of data to be transmitted. The frame may consist of either a single file or a plurality of files. In the present embodiment, a case in which the Producer 30 transmits a send request of a single file to the Consumer 40 is considered as a matter of convenience.

Figure 13:
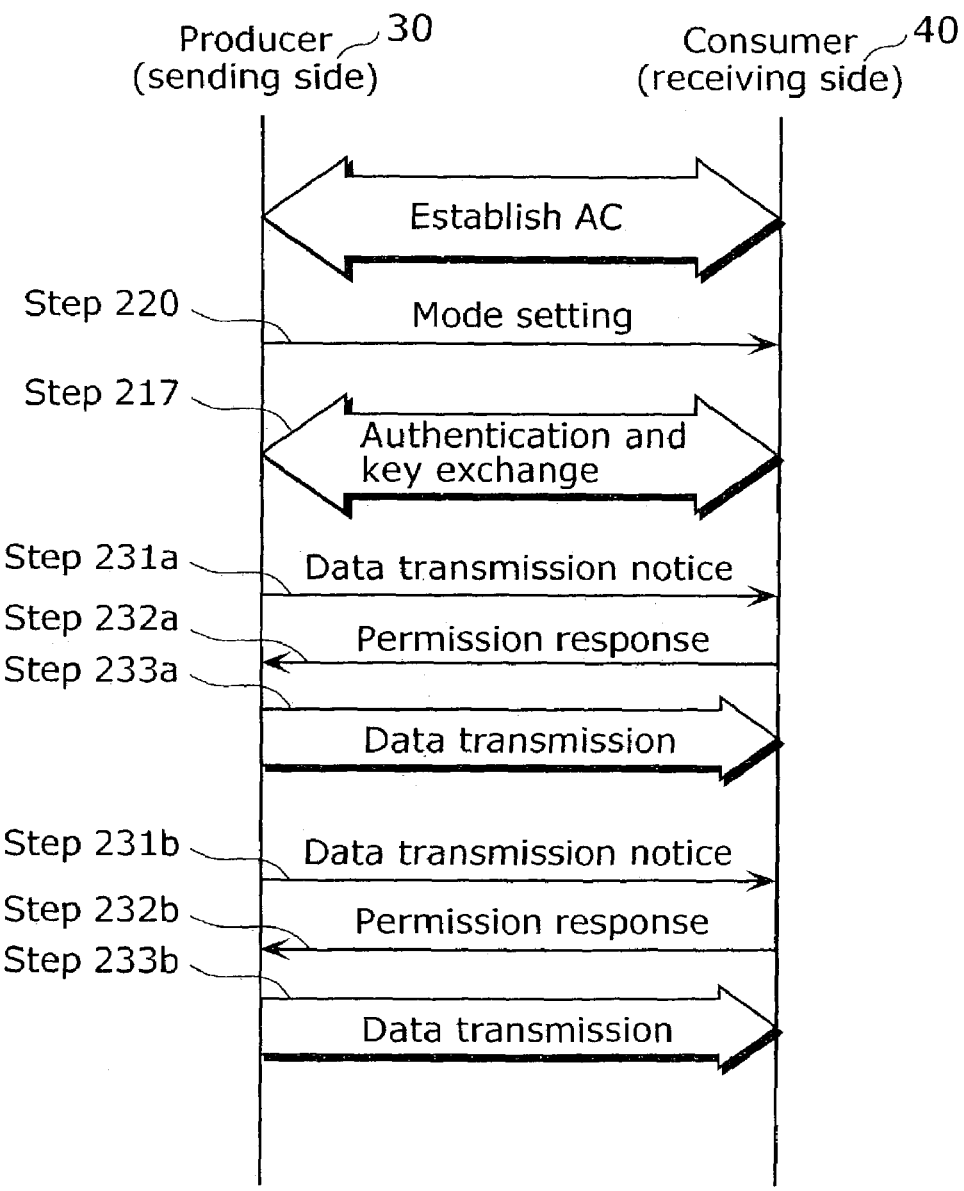
FIG. 13 is a schematic diagram of a communication sequence in a case in which a sending side requests a data transmission to a receiving side according to a third embodiment.

FIG. 13 is a schematic diagram of a communication sequence when the Producer 30 (sending side) has a data transmission notice to the Consumer 40 (receiving side).

Firstly, the Producer 30 outputs a mode setting command when the Asynchronous Connection is established (Step 220) so as to inform that the data is to be transmitted by an encryption mode. The Consumer 40, receiving the notice, performs the processing of device authentication and key exchange (Step 217). When the device authentication and the key exchange are completed, the Producer 30 sends a data transmission notice to the Consumer 40 (Step 231a); the Consumer 40 sends a permission response to it (Step 232a); and the data transmission is started (Step 233a). Here, the data to be transmitted is encrypted and decrypted using an encryption key shared between the Producer 30 and the Consumer 40.

When the data transmission is completed and the next data transmission notice is sent from the Producer 30 (Step 231b), the Producer 30 and the Consumer 40 update the encryption key (not shown in the diagram) so as to start the next data transmission (Step 233b).

Figure 14A:
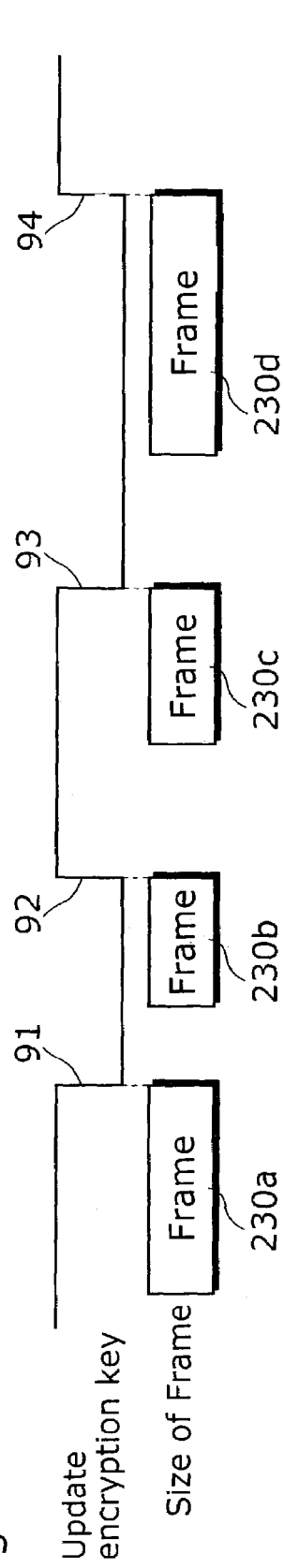
FIG. 14A is a pattern diagram showing a temporal relation between a frame smaller than a predetermined size and an updating timing when a plurality of frames are transmitted.
Figure 14B:
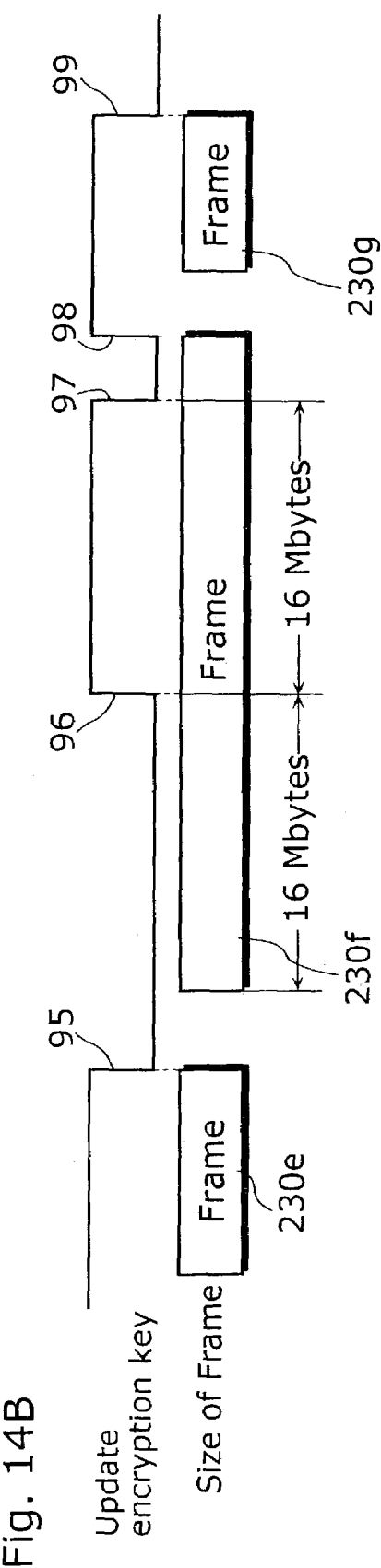
FIG. 14B is a pattern diagram showing a temporal relation between a frame bigger than the predetermined size and an updating timing when the plurality of frames are transmitted.

FIGS. 14A and 14B are pattern diagrams showing a temporal relation between a frame and an updating timing of the encryption key when a plurality of frames are transmitted. Here, it is assumed that a plurality of frames are transmitted in a single Asynchronous Connection.

In FIG. 14A, it is assumed that all the frames 230a~230d are smaller than a size that is predetermined beforehand (for instance, 16 MB). Moreover, when each frame (230a~230d) is transmitted, the encryption is performed using different encryption keys (91~94) that are updated respectively.

However, in a case in which a frame 230f that is bigger than the predetermined size (here it is 16 MB) can be included in a frame to be transmitted as shown in FIG. 14B, the frame (a frame 230f in this case) is divided into the predetermined size (16 MB here) so that the encryption key is updated according to the predetermined size. This is one of the solutions to keep the damages by the data exploitation to a minimum.

Here, the predetermined size is assumed to be 16 MB, however, the size cannot be restricted to this and an arbitrary size may be set.

Figure 15:
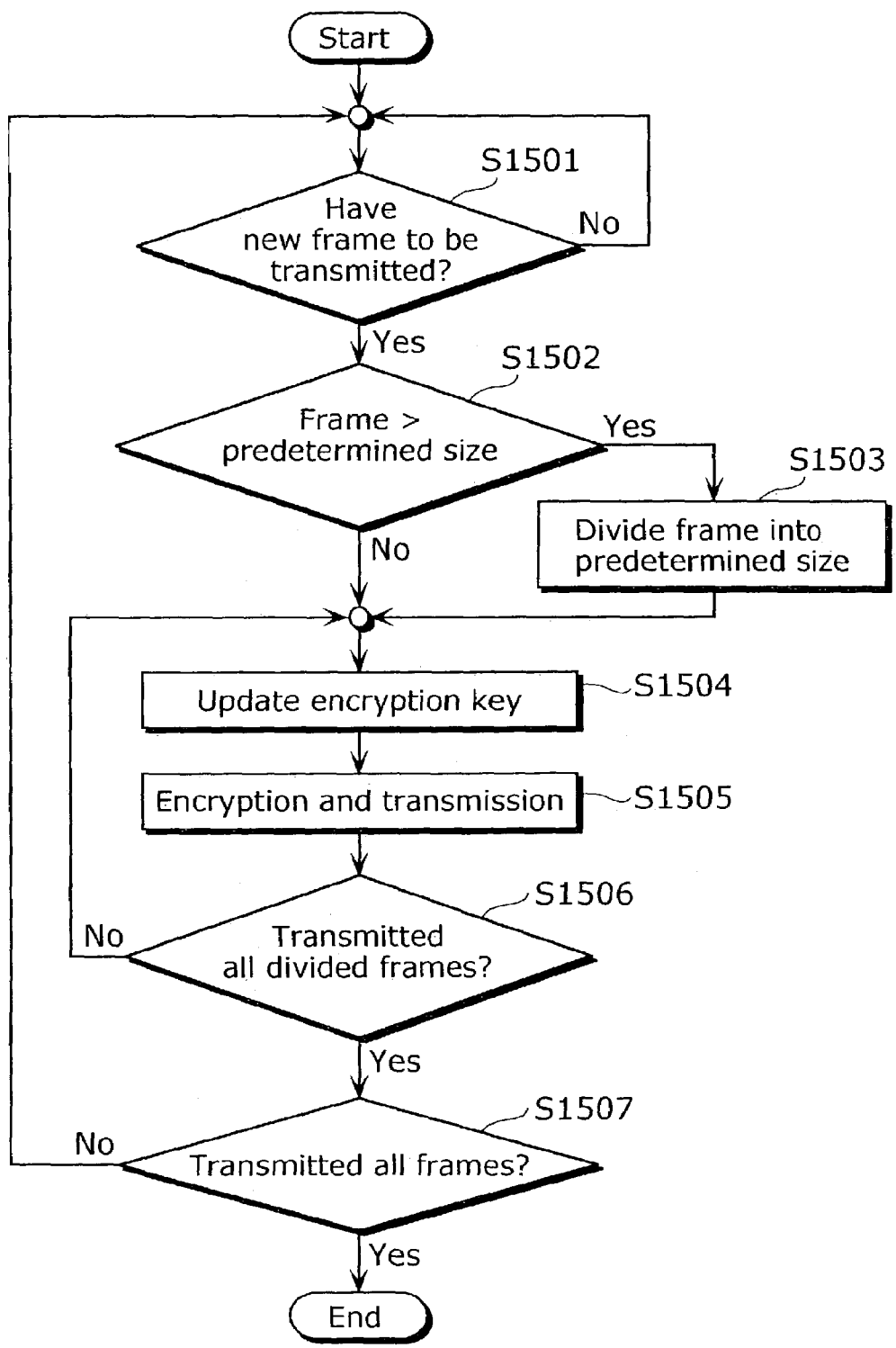
FIG. 15 is a flowchart showing a case of updating an encryption key when the plurality of frames are transmitted.

FIG. 15 is a flowchart showing a case of updating an encryption key when a plurality of frames are transmitted.

Firstly, when a new frame to be transmitted is found (S1501) the Producer 30 determines whether the size of the frame is bigger than the predetermined size (16 MB) or not (S1502).

Next, when the frame is bigger than the predetermined size (16 MB) (S1502: Yes), the Producer 30 divides the frame to be the predetermined size (16 MB) (S1503).

Consequently, the Producer 30 updates the encryption key (S1504), encrypts the frame with this encryption key and sends it to the Consumer 40 (S1505). The Producer 30 changes the encryption key using a unit of divided data when the frame is divided into the predetermined size (S1506).

The Producer 30 performs the above processing for all the frames (S1501~S1507).

Thus, a protection of data can be realized in the IEEE1394 Asynchronous transmission by performing a communication using the data transmission system according to the present embodiment and also by performing a mutual device authentication at the sending side and the receiving side after establishing a connection between the two sides without making any big modifications to the Isochronous transmission. The content can be protected from an unauthorized apparatus in case the encryption key is exploited. This is because the encryption is performed using a different encryption key in transmitting the data as the data is encrypted using a different encryption key each time a set of data is transmitted by Asynchronous transmission.

A method of changing encryption keys includes the following method.

Figure 16:
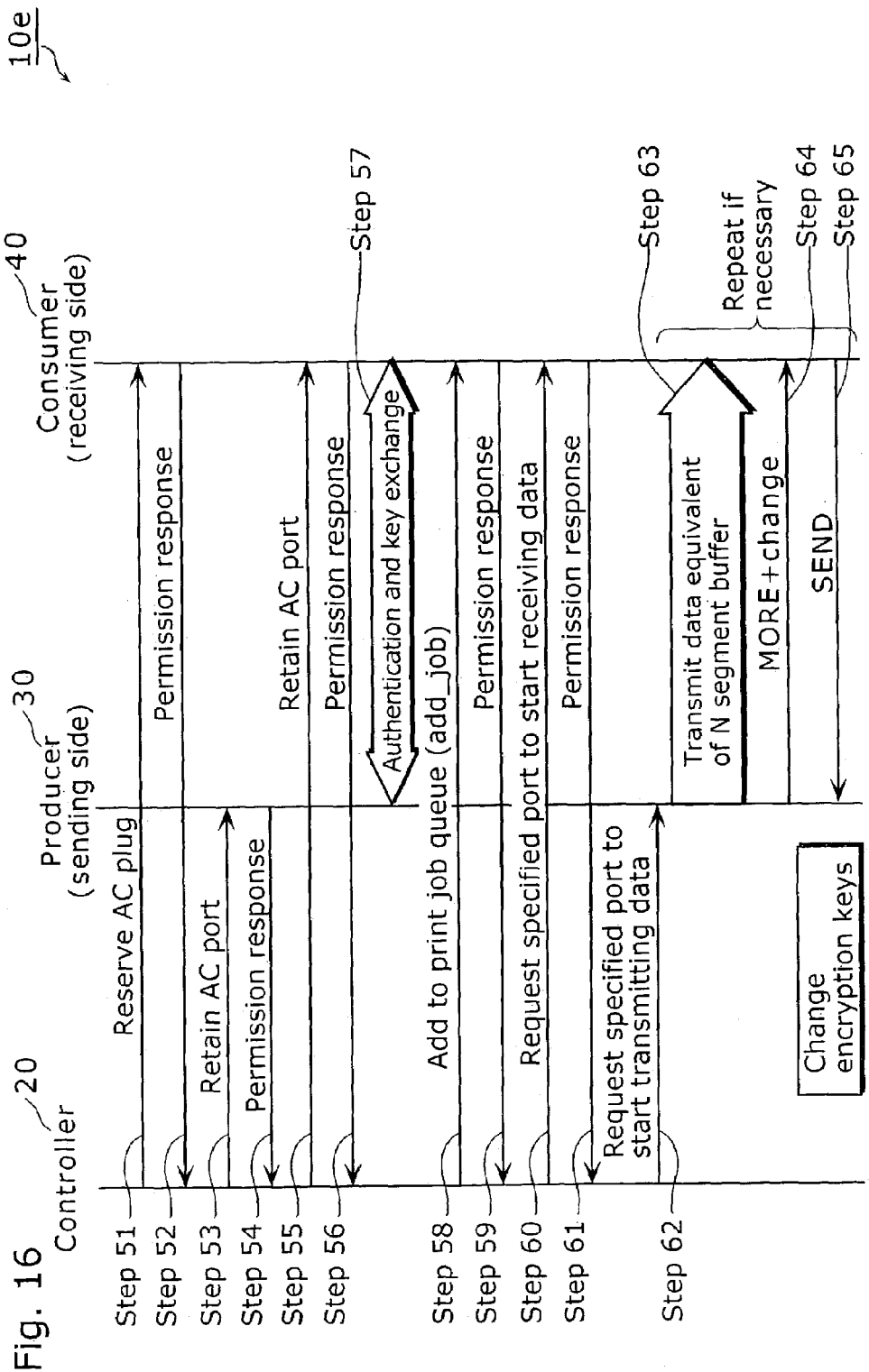
FIG. 16 is a communication sequence diagram of a data transmission system in which the encryption keys are changed using another method according to the third embodiment.

FIG. 16 is a communication sequence diagram of a data transmission system 10e in which encryption key is changed with the use of another method.

First, the Controller 20 sends an "ALLOCATE command" to the Consumer 40 and reserves a receiving plug of the Consumer 40 (Step 51). The Consumer 40, receiving the "ALLOCATE command", reserves the plug and sends back an "ACCEPTED response" (Step 52). Then, the Controller 20, receiving the "ACCEPTED response", sends an "ALLOCATE_ATTACH command" to the Producer 30 (Step 53). The Producer 30, receiving the "ALLOCATE_ATTACH command", connects to a Producer port and sends back an "ACCEPTED response" to the Controller 20 (Step 54). The Controller 20, receiving the "ACCEPTED response", sends an "ATTACH command" to the Consumer 40 (Step 55). The Consumer 40, receiving the "ATTACH command", connects to a Consumer port and sends back an "ACCEPTED response" to the Controller 20 (Step 56). With the processing described up to here, the Asynchronous Connection is established.

Next, authentication and key exchange are performed for sending and receiving the encrypted data of the DTCP.

When the Asynchronous Connection is established, the Consumer 40 notifies the sending side of an authentication request start together with a parameter for authentication without any conditions. The Producer 30 notifies the Consumer 40 of the authentication parameter of the side of the Producer 30 when the data to be transmitted is the data to be encrypted. The Producer 30 and the Consumer 40 receive the authentication parameter respectively, assure mutually that the opposite is a valid apparatus and calculate respectively an authentication key. A "REJECT response" is sent back corresponding to the authentication start request when the data to be transmitted is the data which need not be encrypted.

After that, the Producer 30 encrypts an encryption key for encryption with the use of the calculated authentication key and notifies the Consumer 40 of it. The Consumer 40, receiving the encrypted encryption key, decrypts the encryption key using the authentication key calculated by the Consumer 40 (Step 57).

With the above processing, the exchange of the encryption keys for the first communication is terminated. The transmission of the data is performed when the exchange of the encryption keys is completed. As for the transmission of the data, the Consumer port to which the connection is established is defined at first so that a command to be added to a print job queue may be issued (Step 58). When this is accepted, the specified port of the Consumer 40 is requested to start receiving data (Step 60), the specified port of the Producer 30 is requested to start transmitting data (Step 62), and the data transmission is started (Step 63).

In the Asynchronous data transmission, writing is performed using a unit of the segment buffer 40b as shown in FIG. 9. Therefore, when the data larger than the segment buffer 40b is transmitted, the data is divided into a plurality of blocks for transmission. As is already described, the Producer 30 informs that the data continues to be transmitted, having a mode field of the iAPR as "MORE", when the data to be transmitted is still left after the transmission to the segment buffer 40b. In this case, the Producer 30 can notify the Consumer 40 that the encryption key is changed from the next data transmission if the reserve field 61 of the iAPR shown in FIG. 10 is defined to notify of the change of the encryption key (Step 64).

As for the generation of the encryption keys in the DTCP, since it varies according to the predetermined random numbers setting the exchanged encryption key as an initial entry, it allows the sending side and the receiving side to change their encryption keys by synchronizing them if only the initial entry and the changing timing of the encryption keys can be synchronized. Consequently, it allows the determination of the number of times for changing the encryption key as well as its timing and also the prevention from the malicious usage during the data transmission before it occurs when the sending side performs the predetermined writing in an arbitrary segment buffer.

Here, a system in which the changing timing of the encryption key is informed of by writing the predetermined data in the iAPR is explained. The same effects can be obtained, however, by constructing in such a way that the receiving side is an agent to notify the oAPR at the sending side of the changing timing. Also, the same effects as described above can be obtained in a system using a FCP (Function Control Protocol) which is another command transfer protocol.

Figure 17:
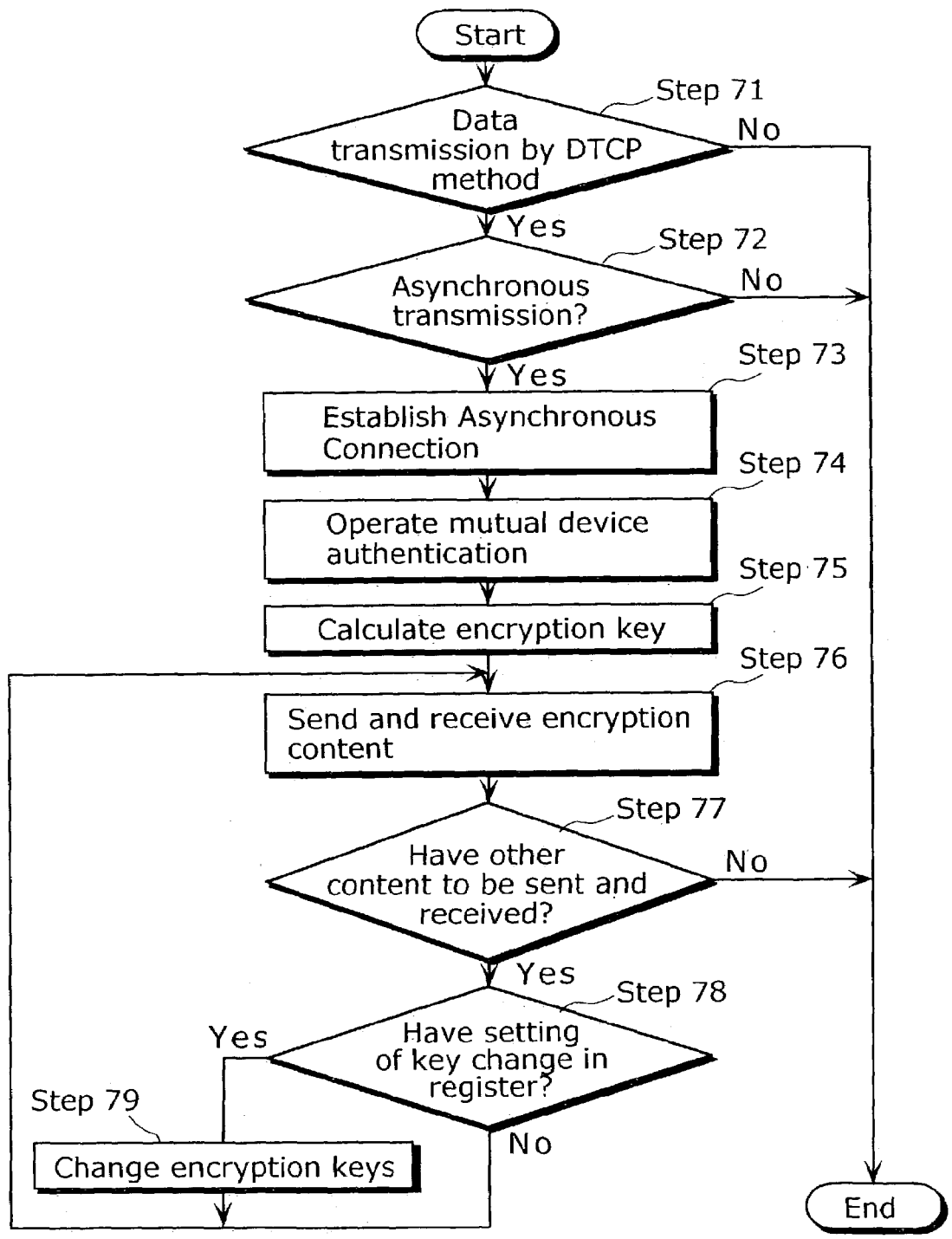
FIG. 17 is a flowchart showing a case of changing the encryption keys in process of data transmission under a data transmission system according to the third embodiment.

FIG. 17 is a flowchart showing a case of changing the encryption key during the data transmission under the data transmission system 10e.

Firstly, the Controller 20, identifying that a data transmission method is a DTCP method and at the same time is an Asynchronous method (Steps 71 and 72), performs an establishment of a connection for the Asynchronous transmission in the Producer 30 and the Consumer 40 (Step 73) as well as the mutual device authentication and key exchange (Step 74).

Furthermore, the Producer 30 informs of the changing timing of the encryption key by using the reserve field 61 in the iAPR register 60 in spite that a set of data is in process of being transmitted (Steps 76~79).

As described above, according to the data transmission system of the present embodiment, since the encryption keys are changed accordingly using the reserve field or the like in the iAPR register or the like in the mid course of the Asynchronous transmission of a set of data, the encryption keys are changed freely when necessary as it allows the sending side and the receiving side to accord the changing timing of the encryption keys.

Fourth Embodiment

Figure 1:
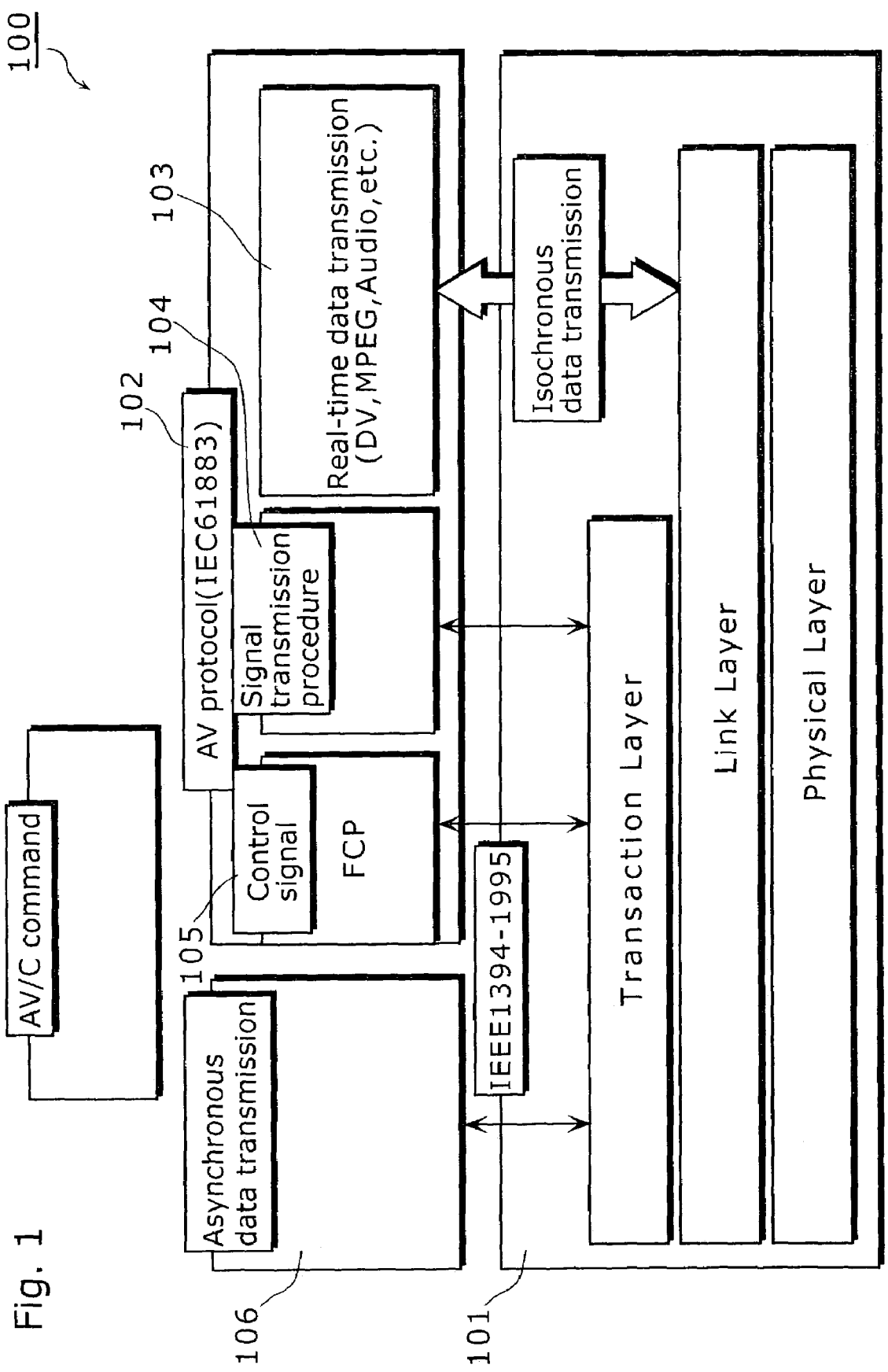
FIG. 1 is a diagram showing an AV protocol stack in a case of using an IEEE1394 for a conventional transmission of digital video signals and digital audio signals.
Figure 2:
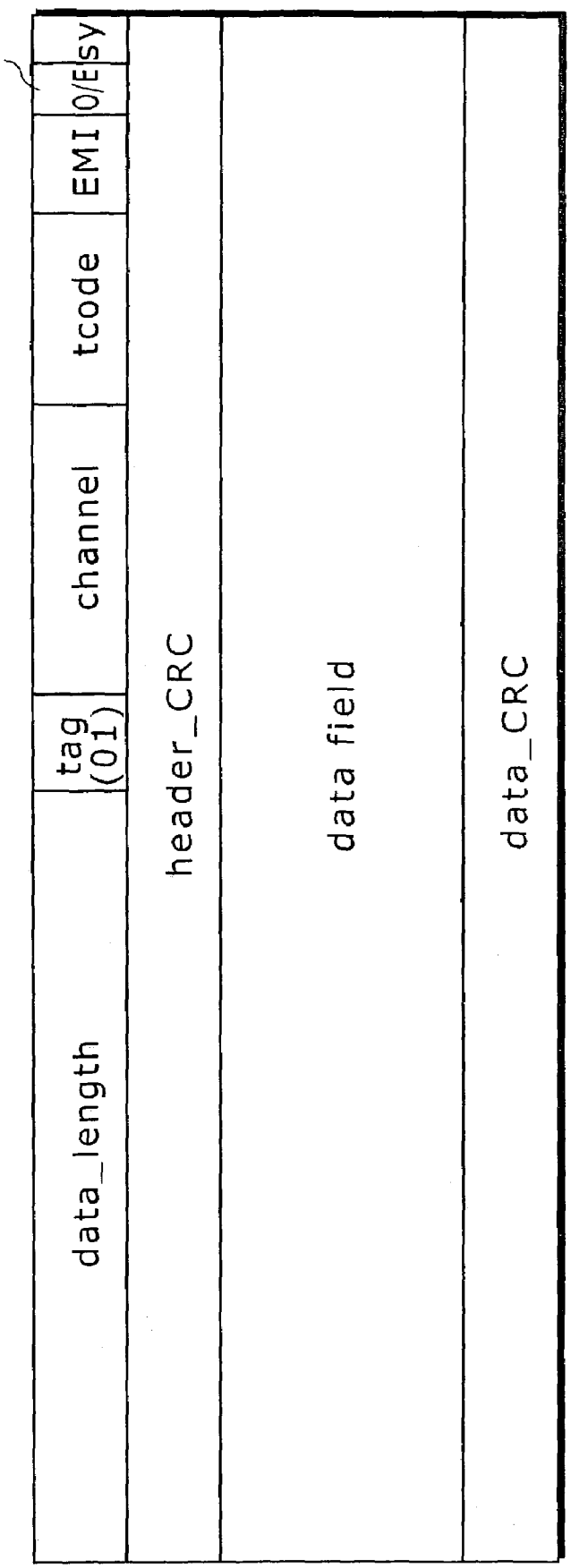
FIG. 2 is a packet structure diagram of Isochronous packet for Isochronous communication.
Figure 3:
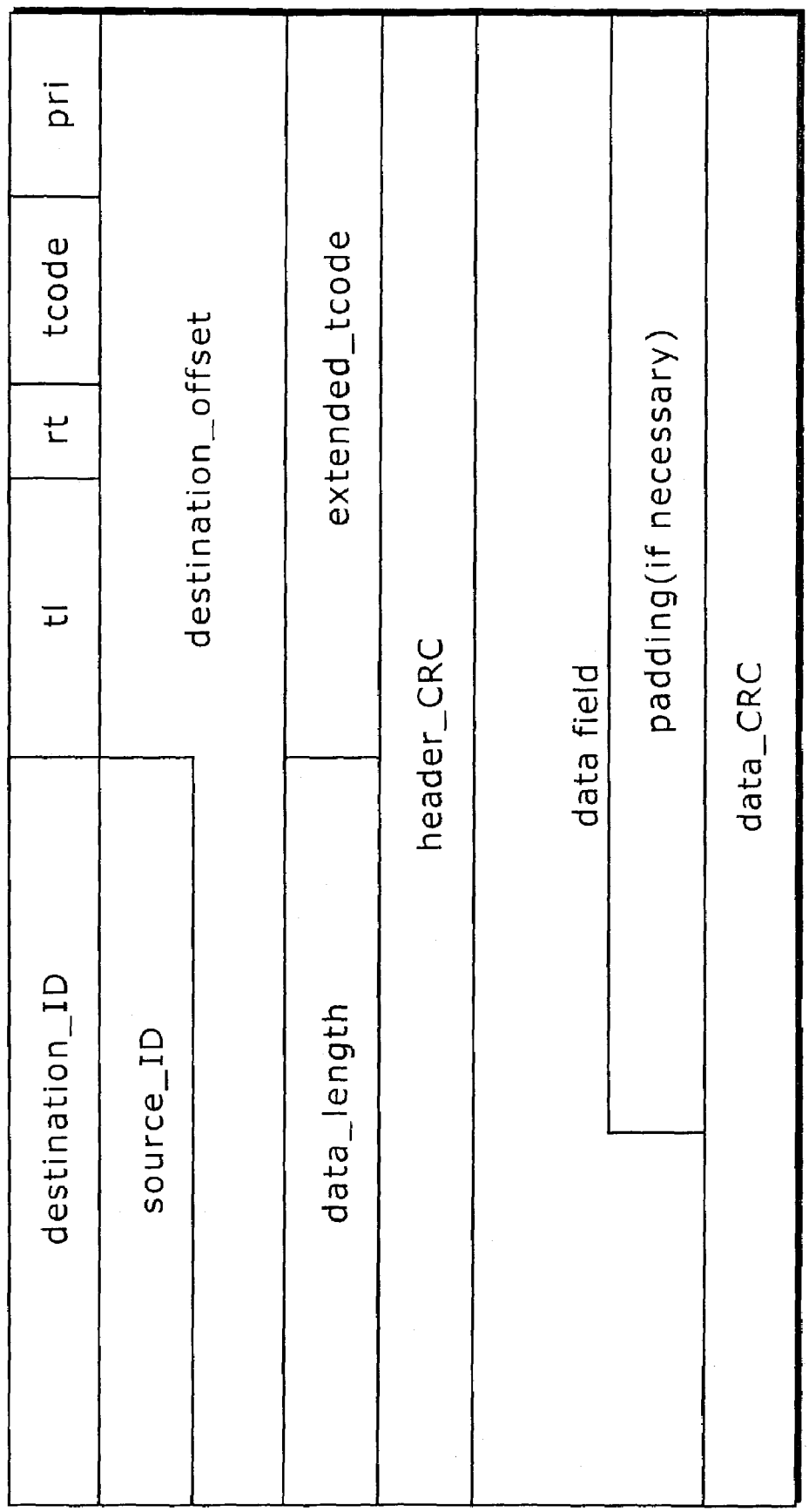
FIG. 3 is a packet structure diagram of Asynchronous packet for Asynchronous communication.
Figure 4:
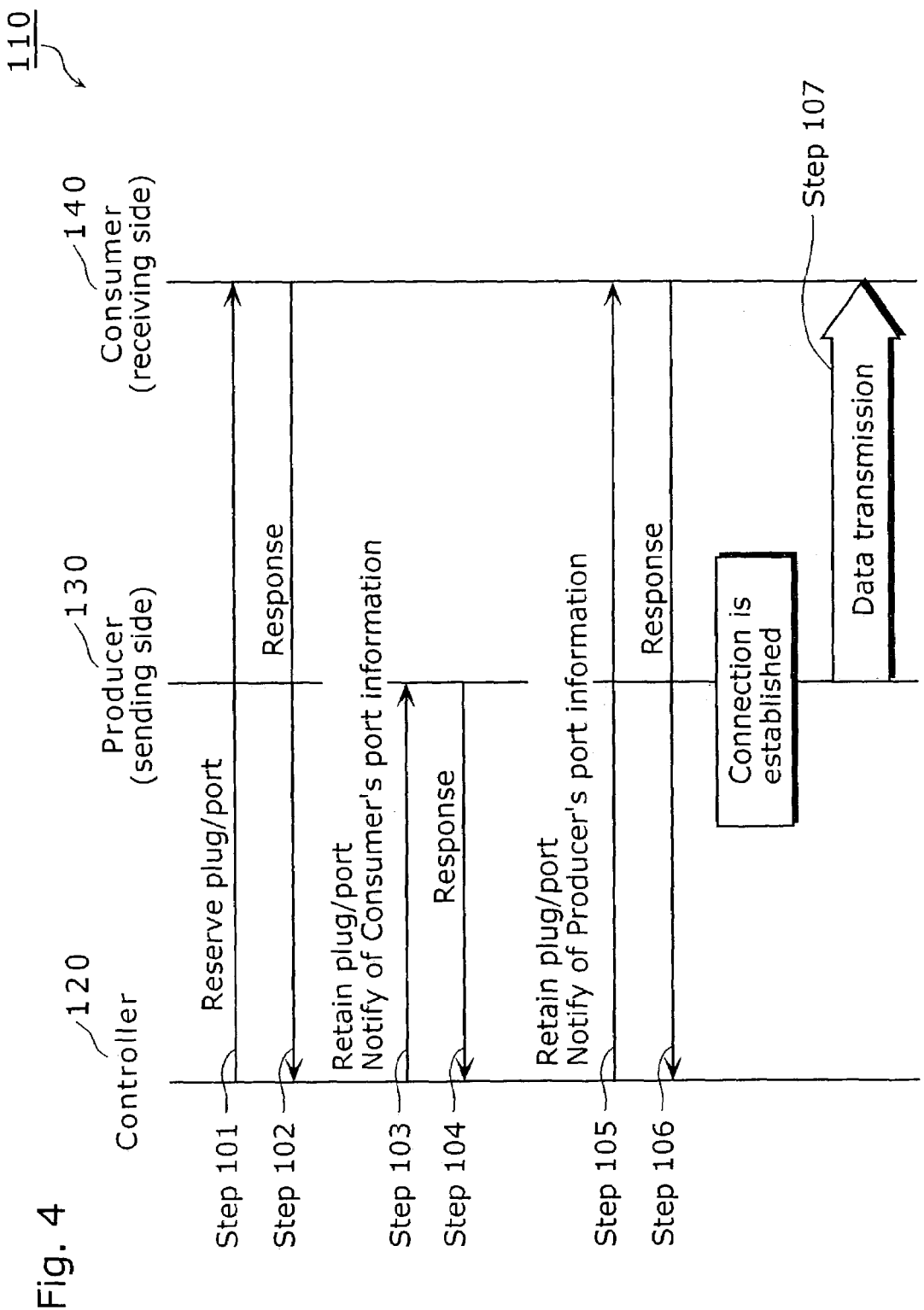
FIG. 4 is a communication sequence diagram of a conventional Asynchronous communication.

In the present embodiment, an updating means for the encryption keys and a data structure of a packet are explained in detail. As for the IEEE1394 Asynchronous transmission, as is explained above, data is transmitted in a form in which the data is stored in an Asynchronous packet as shown in FIG. 3. The frame 30a is thereby divided into the size befitting a "data field" of the Asynchronous packet as shown in FIG. 9. Here, it is assumed that the data is simply divided into packets.

Here, it is required to store in the packet a signal showing the changing timing in order to change periodically the encryption keys used in the Asynchronous transmission in the same manner as in the Isochronous transmission. Moreover, an encryption mode identifier (hereafter referred to as "EMI: Encryption Mode Indicator") is necessary for informing of the type of encryption. Nevertheless, since the header part does not have any free space for the data to be stored as described before, some sort of header information needs to be stored in the data area.

FIG. 18 is a data structure diagram in a case in which a frame 230 is divided into a plurality of packets. The frame 230 is divided into a predetermined size of a PCP packet (256a~256f). Further out, a PCP header 255 is added to each packet. The PCP header 255 includes an encryption key update signal 251, an effective data size of the packet 250 as well as the EMI (not shown in the diagram) and the like.

The present embodiment shows that the encryption key update signal 251 changes at the fifth packet 256e (namely, encryption key update signal changes from "0" to "1"). Consequently, the updated encryption key is used from the fifth packet 256e. In addition, each packet is divided into a plurality of unit blocks 252 which is the smallest unit for encryption. In other words, data of "m" number of unit blocks is grouped together to make a single packet.

A packet 256f, the last one of the frame, however, may not always be the same size as the unit block. Therefore, when the last block 253 of the last packet 256f is smaller than the unit block, the lacking part can have padding data 254 added thereto so as to perform data transmission in such a way that the last block may be the same size as the unit block. In thus doing, fraction processing for block encryption can be abbreviated.

Also, the size of the data 258 being encrypted in the last packet 256f can be easily found by calculation if the size of the unit block is well-known by recording the effective data size 250 in the PCP header 255. Furthermore, these calculations become much easier by setting the size of the PCP header to be the integer multiple (nth times) size of the unit block.

For example, when the data consists of a unit packet including a PCP header of 512 bytes, a unit block of 4 bytes and a PCP header of 4 bytes with a whole frame of 910 bytes, the data of the first packet is 508 bytes and the data of the second packet is 402 bytes. Since the data of the second packet of 402 bytes is aliquant by the unit block sized 4 bytes, padding is to be performed for the 2 bytes. However, the data size of 402 bytes excluding the padding is stored in the effective data field of the PCP header.

As for the data targeted for encryption, the first packet is 508 bytes, the second packet is 404 bytes and the both are integer multiple of 4 bytes which is the size of the unit block, therefore, the fraction processing at the time of encryption is unnecessary. It is easy to find the size of the data being encrypted if the effective number of bytes of the PCP header is identified as 402 bytes at the time of decryption.

Figure 19A:
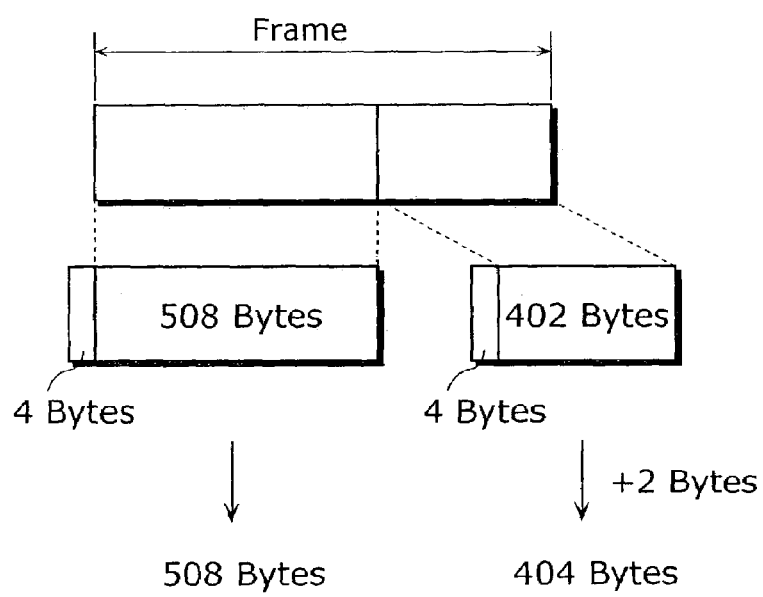
FIG. 19A is a schematic diagram showing a calculation method of data size according to the fourth embodiment.
Figure 19B:
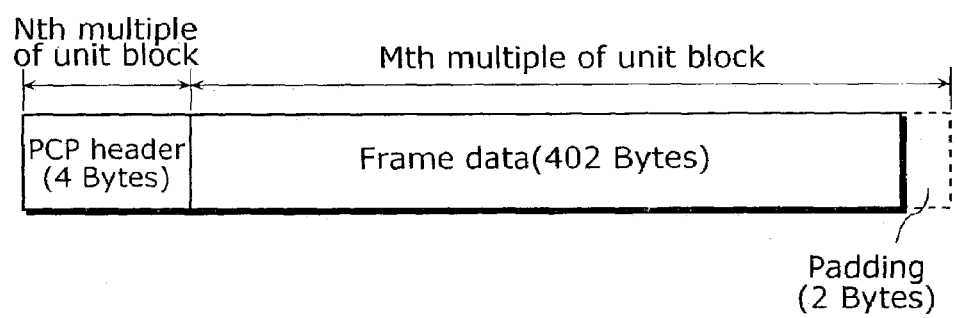
FIG. 19B is a diagram showing a data structure of a PCP packet consisting of integer multiple data of a unit block.

FIG. 19B is a diagram showing a data structure of a PCP packet consisting of integer multiple data of a unit block as described above.

Thus, according to the data transmission system of the present embodiment, the information on the changing timing of the encryption keys is stored in the Asynchronous packet to be shared between the sending side and the receiving side. What is more, a simplification of encrypting processing can be attempted by setting a data size of the Asynchronous packet to be an integer multiple of a predetermined unit block.

Fifth Embodiment

An embodiment in the case in which a frame consists of a single file is explained in the third and the fourth embodiments; however, the present embodiment describes a case in which a frame consists of a plurality of files (i.e., two) and the EMI differs according to the file.

FIG. 20 is a diagram showing a dividing method of send data when the data in which a frame consists of two files is transmitted. When a file 1 is larger than a predetermined data size (16 MB here), the encryption key is updated every 16 MB as explained in the third embodiment. The rest of the data of the file 1 is encrypted by the updated encryption key and then transmitted. In this case, the size of the last packet of the file 1 is not always the same size as the defined packet size. When the EMI of the file 1 is different from that of the file 2, the EMI 251 of each PCP header needs to be separated and thereby two files cannot be stored in the same packet.

In order to ensure the continuity as a frame, padding is performed for the shortfall with non-encrypted data 260b so that the last packet of the file 1 may become the same size as the defined packet size (this padding is called "Alignment Padding"). When the file is changed (changed from "file 1" to "file 2"), the encryption keys are changed although the size of the file is less than 16 MB).

Thus, on the receiving side, a calculation of the size for the data being encrypted is realized with the use of the effective data size 250 of the last packet of the file 1, and the size of the data being padded can be further calculated. When the encryption key has been updated although the data is less than 16 MB, it can be assumed that there is a possibility that the padding is performed. Then, the data of the first packet of the file 2 can be stored in the packet starting from the edge and the EMI of the PCP header as well as that of the file 2 can also be stored in each file. For example, in the case of transmitting the content consisting of a plurality of files as in a case of language of the XML kind, such a method is useful.

Also, in a case of transmitting the same content from the sending side based on the request from the receiving side, padding processing according to the present embodiment can be avoided when a frame is divided into the requested unit of data since it is general that the request to transmit the content is made according to the data specification of the receiving side.

Sixth Embodiment

An embodiment of the case in which the header contains the EMI is explained in the fifth embodiment, however, the present embodiment shows a case in which an identifier (hereafter referred to as CT: Content Type), defining a handling method of the data in the receiving apparatus which has received the content, is added to the header.

In the DTCP, how to handle the received data is defined in detail according to the content. For example, it is defined that a sending apparatus that can analyze copy control information (hereafter referred to as CCI: Content Control Information) included in the content such as MPEG-TS which employs the DTCP should analyze the CCI contained in the content and add a predetermined EMI for printing or should handle in such a way for AM824 Audio content defined in IEC61883-6. How to handle the data received at the receiving apparatus side can be identified by transmitting the type of content as a header in the form of an identifier.

Figure 21:
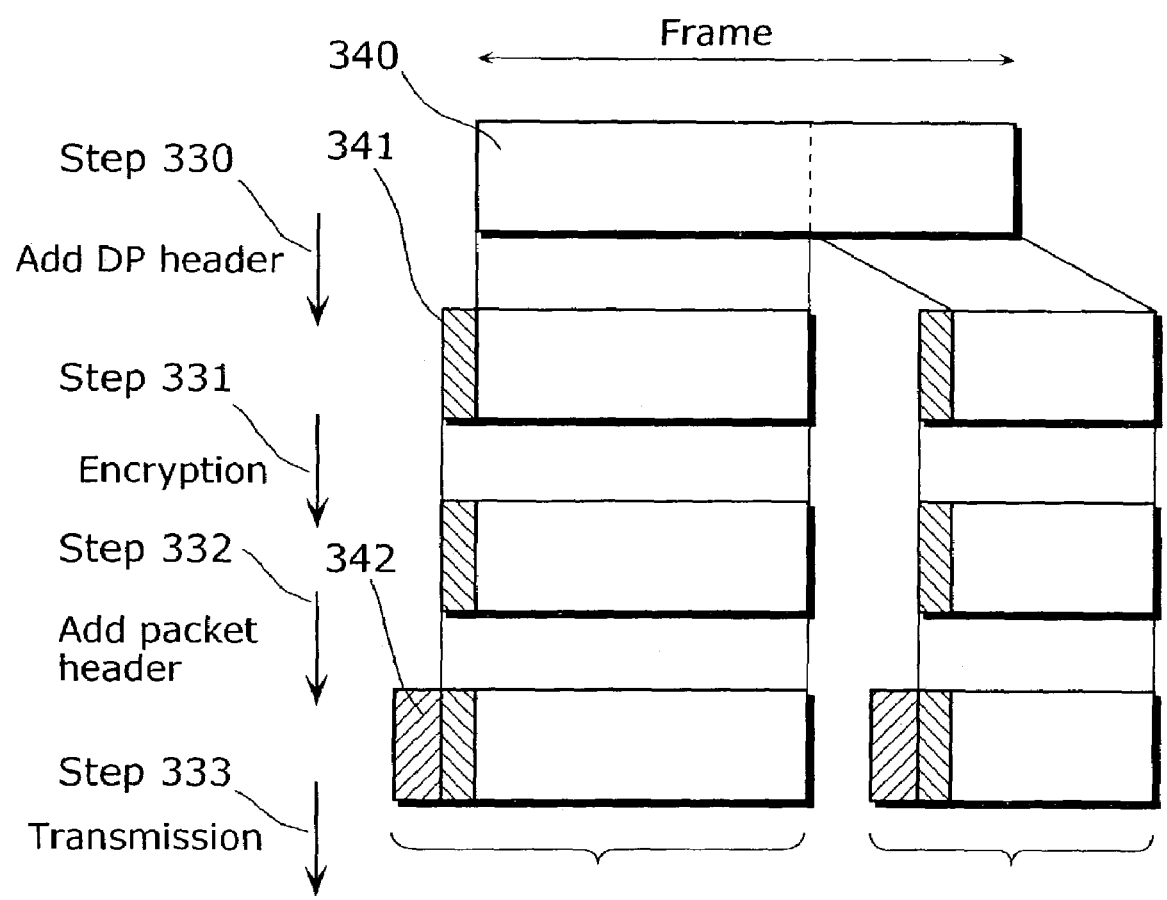
FIG. 21 is a diagram showing a transition of a data structure when data is transmitted according to a sixth embodiment.

FIG. 21 is a diagram showing a transition of a data structure of a frame at the time of Asynchronous transmission. The frame of the content is divided into a data packet 340 to which a data packet header 341 is added (Step 330). The data to which the data packet is added is encrypted together with the data header (Step 331). The encrypted data is sent with a packet header 342 attached.

The receiving apparatus responding to this data takes the packet header off, decrypts the encrypted data, extracts the CT contained in the data packet header as well as takes the data packet header off and decrypts the data. The receiving apparatus then performs detailed processing for the received data using the EMI information contained in the packet header, the CT extracted from the data packet header and the CCI stored in the content as circumstances demand.

Thus, an illegal action such as exploiting the content can be prevented by encrypting the CT header to which the identifier defining the handling of the data is attached.

Seventh Embodiment

The data transmission method is explained in the above-mentioned 1~6 embodiments; however, the present embodiment illustrates the usage of authentication keys between the apparatuses that can support a plurality of logical connections.

Figure 22:
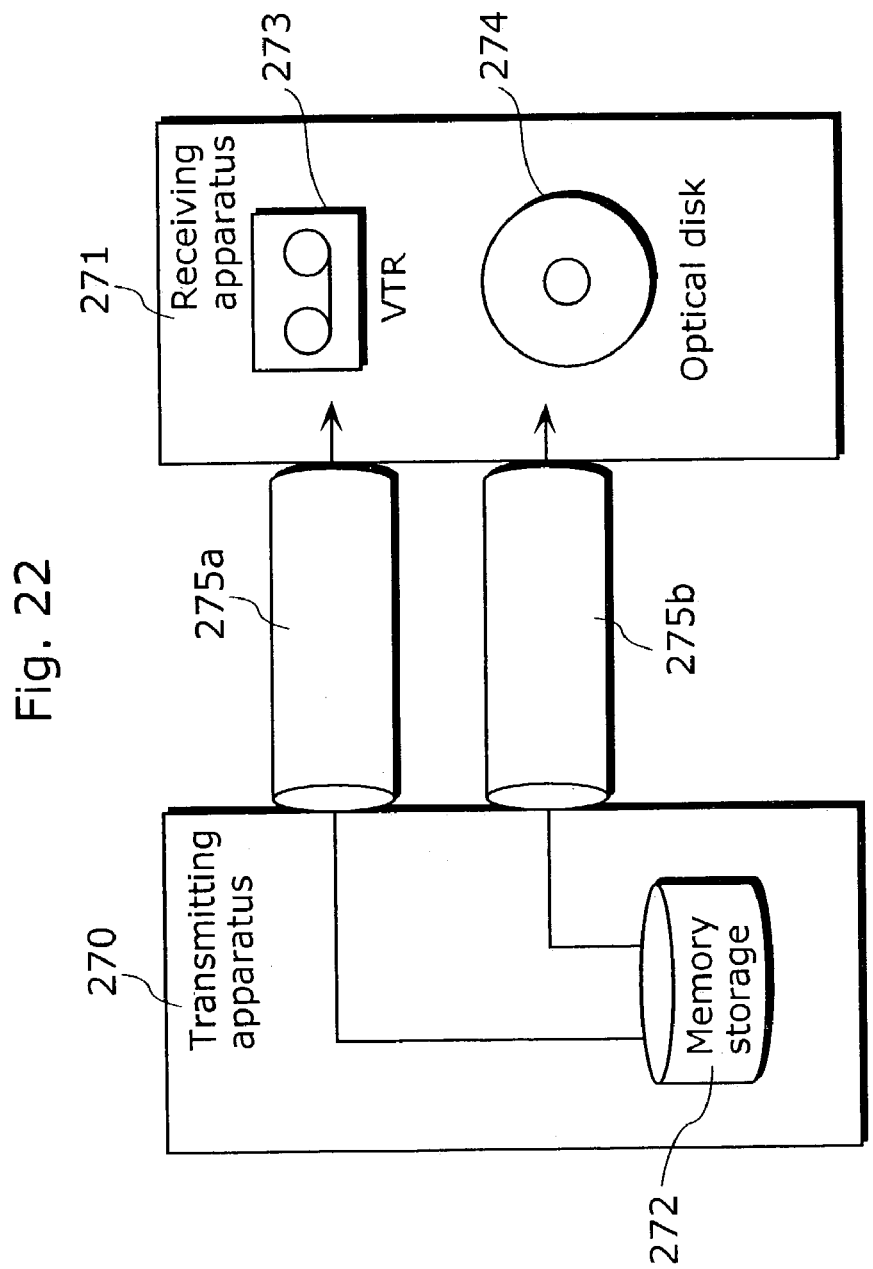
FIG. 22 is an example of a system configuration according to a seventh embodiment.

Here, a case of sending and receiving data using two logical connections between two apparatuses as shown in FIG. 22 is considered. A case of recording the content stored in a storage memory 272 in a transmitting apparatus 270 in the first memory device (i.e., VTR) 273 and the second memory device (i.e., DVD) 274 of a transmitting apparatus 271 using two logical connections 275a and 275b.

The recording to the first memory device 273 starts at first and then the start of the recording to the second memory device 274 follows.

Figure 23:
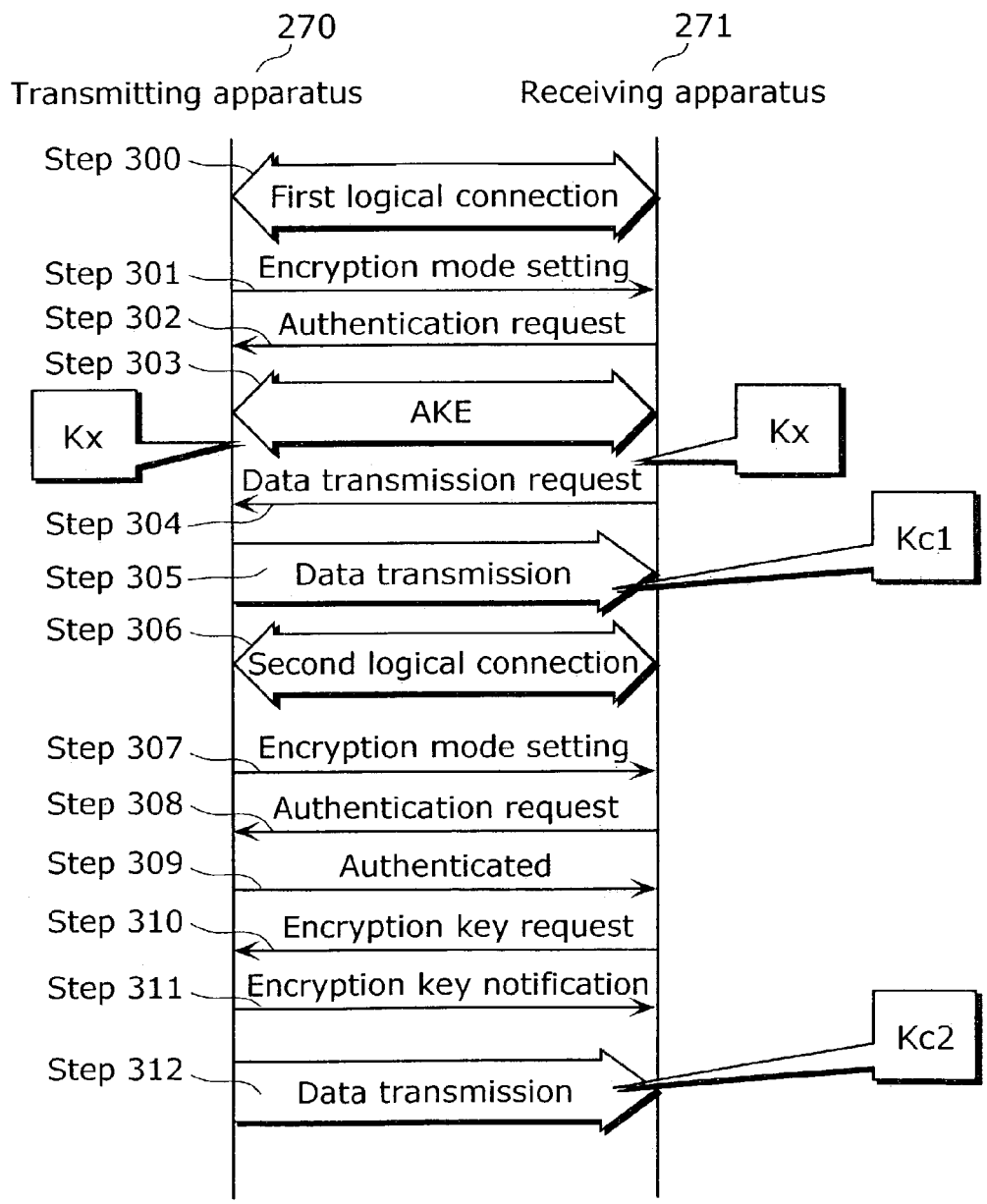
FIG. 23 is a schematic communication sequence diagram when data is transmitted according to the seventh embodiment.

FIG. 23 is a communication sequence diagram for establishing the logical connection as mentioned above. Firstly, the first logical connection 275a is established (Step 300). The transmitting apparatus 270 informs the receiving apparatus 271 of an encryption mode (Step 301). The receiving apparatus 271, receiving the encryption mode, issues an authentication start request to the transmitting apparatus 270 (Step 302).

Here, the transmitting apparatus 270 and the receiving apparatus 271 enter the AKE sequence as explained above, performs authentication and exchange keys Kx (Step 303). When the AKE is completed, the receiving apparatus 271 sends a data transmission request to the transmitting apparatus 270 (Step 304), and then the data transmission is started (Step 305). This example explains the case in which the receiving apparatus issues the data transmission request; however, the same applies to a case in which a transmitting apparatus sends a data transmission notice.

Next, a case of establishing the second logical connection 275b in the middle of the communication using the first logical connection 275a is considered. When the second logical connection is established (Step 306), the transmitting apparatus 270 notifies the receiving apparatus 271 of an encryption mode as in the case of the first logical connection (Step 307). The receiving apparatus 271, receiving the encryption mode, issues an authentication start request to the transmitting apparatus 270 (Step 308), however, the transmitting apparatus 270 sends an authenticated notice because the authentication is already completed (Step 309). The receiving apparatus 271, finding that the authentication is completed, requests the encryption key (Step 310) and the encryption key is notified of by the transmitting apparatus 270 (Step 311). At this point, the data transmission is ready for start since the preparation for decrypting the encrypted data is made at the receiving apparatus 271 (Step 312).

As for the data transmission with the two logical connections, the asynchronous method may be applied to one connection while the isochronous method is applied to the other or either of asynchronous method and isochronous method may be applied to the both connections.

Thus, in the case in which a plurality of logical connections can be established between two apparatuses, it is possible to shorten the processing time regarding the authentication by appropriating the processing of the device authentication.

Eighth Embodiment

In the above-mentioned first to seventh embodiments, a transmission method presupposing that the device authentication is performed each time the Asynchronous Connection is established is explained, however, the embodiment described below illustrates a method in which the device authentication is performed only when the connection is electrically made for the first time and only the change of encryption keys is performed at the time of subsequent establishments of the connection.

Figure 24:
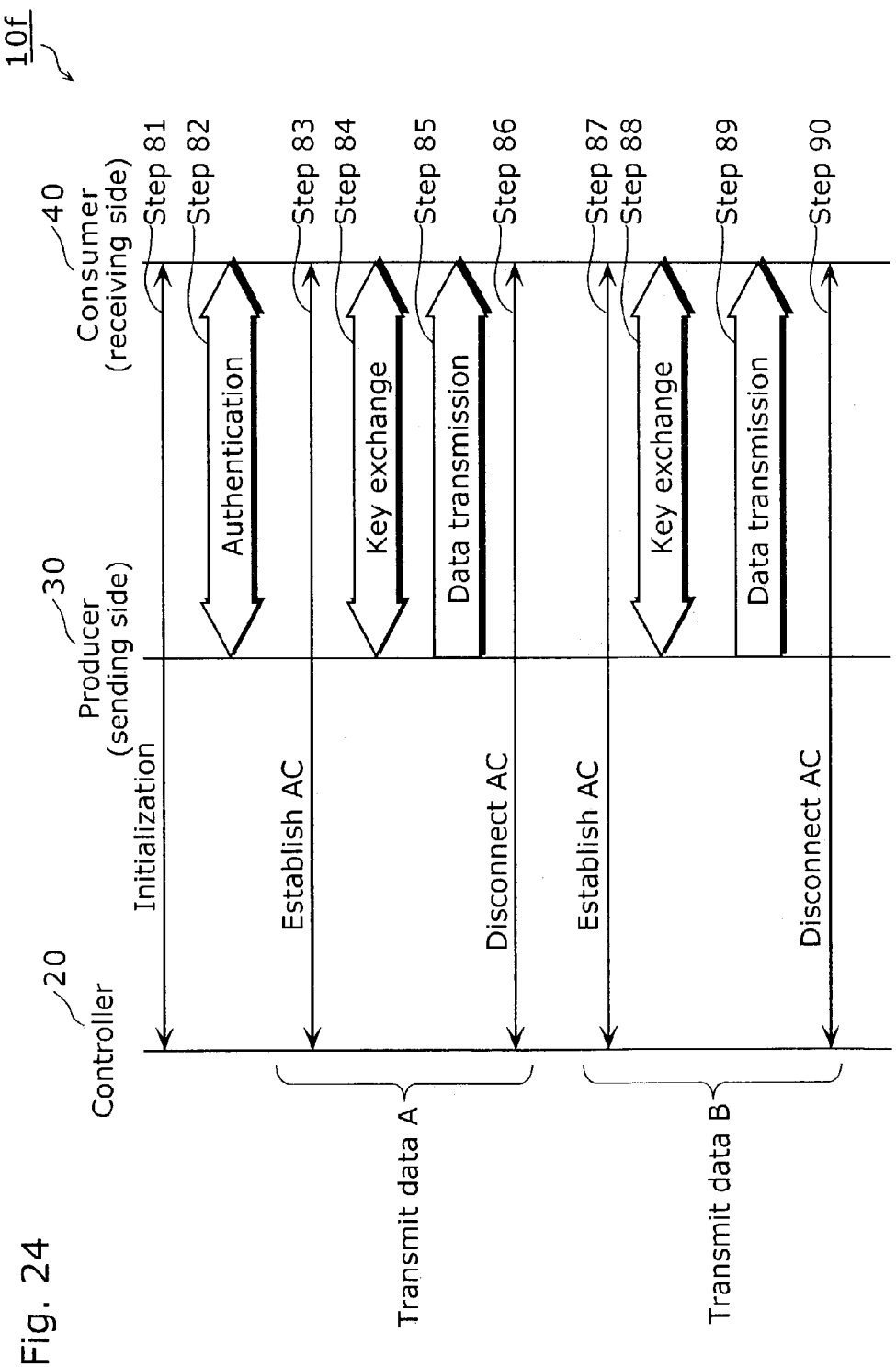
FIG. 24 is a communication sequence diagram of a data transmission system according to an eighth embodiment.

FIG. 24 is a communication sequence diagram in a data transmission system 10f according to the present embodiment. The Producer 30 (sending side) and the Consumer 40 (receiving side), as a start, perform processing of initialization when the IEEE1394 bus is electrically connected (Step 81). After that, the Producer 30 and the Consumer 40 perform a mutual device authentication (Step 82). As for the authentication method, it is explained in the above-mentioned embodiments; therefore, the explanation is abbreviated here.

The establishment of the Asynchronous Connection is performed in advance for transmitting data A (Step 83). Regarding the processing, the explanation is abbreviated here as is already made in the above-mentioned embodiments. The Producer 30 and the Consumer 40 exchange the encryption keys at the stage when the connection is established (Step 84). Then, the data transmission is performed after the completion of the exchange of the encryption keys (Step 85). When all the data is transmitted, the connection is released being disconnected (Step 86).

Next, an establishment of the Asynchronous Connection is newly made for transmitting data B (Step 87). At the stage of establishing a connection for this case, the device authentication is not performed, only the new exchange of encryption keys is performed between the Producer 30 and the Consumer 40 (Step 88). The encryption key to be used for this time differs from the one used for transmitting the data A. Hereinafter, only the exchange of the encryption keys takes place each time the Asynchronous Connection is established in the same way. The embodiment of transmitting two pieces of data, that is, data A and data B, is described above, however, the case of transmitting more than two pieces of data can be demonstrated in the same way.

Thus, according to the data transmission system of the present embodiment, the mutual device authentication between the sending side and the receiving side is performed only for the first time being connected electrically, therefore, the time necessary for device authentication can be reduced as well as the illegal exploitation of data can be prevented since the change of the encryption keys is performed each time the connection is established.

In the above-mentioned embodiments, it is obvious that the same effects can be obtained even if the encryption keys are set to be changed under the same connection. Moreover, the case in which the device authentication is performed at the time of initializing processing is explained in the above-mentioned embodiments, however, the data transmission system may be constructed in such a way that the authentication is performed in a longer cycle compared to the data transmission such as a cycle of every few hours, every day, once a week, every ten times of data transmission or the like.

INDUSTRIAL APPLICABILITY

As described above, a data transmitting apparatus, a data receiving apparatus, a data transmission system and a data transmission method according to the present invention are suitable for a communication system such as a micro computer (for example, between a STB and a printer) for realizing an asynchronous communication method (for example, Asynchronous communication using an IEEE1394) by applying almost directly a prior system of isochronous communication method (for instance, Isochronous communication using an IEEE1394).

The invention claimed is:

1. A data transmitting apparatus for transmitting data to a data receiving apparatus via a communication interface using an asynchronous communication method, the data transmitting apparatus comprising:
    a connection establishment unit operable to establish a logical transmission path between said data transmitting apparatus and the data receiving apparatus by exchanging information with the data receiving apparatus;
    a device authentication unit operable to perform a device authentication for the data receiving apparatus (i) before the logical transmission path is established, (ii) during a process of establishing the logical transmission path, or (iii) after the logical transmission path is established;
    an encryption key sharing unit operable to generate an encryption key based on a result of the device authentication performed by said device authentication unit and allow shared use of the generated encryption key between said data transmitting apparatus and the data receiving apparatus by communicating, using a reserve field in a dedicated area for notifying a status of the transmission, information pertaining to a changing timing of the encryption key; and
    a data transmission unit operable to encrypt the data using the shared encryption key and transmit the encrypted data to the data receiving apparatus.

2. The data transmitting apparatus according to claim 1, wherein said device authentication unit includes at least one of a first device authentication unit operable to judge whether or not the data receiving apparatus is an unauthorized apparatus, a second device authentication unit operable to judge whether or not said data receiving apparatus is not an unauthorized apparatus and is a valid apparatus, and a third device authentication unit operable to judge whether or not the data receiving apparatus is a valid apparatus, and
    said encryption key sharing unit allows shared use of the encryption key in one of the cases: (i) when said first device authentication unit judges that the data receiving apparatus is not an unauthorized apparatus, (ii) when said second device authentication unit judges that the data receiving apparatus is not an unauthorized apparatus and is a valid apparatus, and (iii) when said third device authentication unit judges that the data receiving apparatus is a valid apparatus.

3. The data transmitting apparatus according to claim 1, wherein said device authentication unit performs the device authentication when detecting that said data transmitting apparatus and the data receiving apparatus are electrically connected.

4. The data transmitting apparatus according to claim 1, wherein said device authentication unit includes:
    a time keeping unit operable to measure an elapsed time from the time when the logical transmission path is established;
    an authentication request reception unit operable to receive a device authentication request from the data receiving apparatus;
    a request determination unit operable to determine whether said authentication request reception unit has received the device authentication request within a specified time measured by said time keeping unit;

a receiving apparatus mode notification unit operable to send a device authentication non-acceptance notice to the data receiving apparatus when said request determination unit determines that said authentication request reception unit has not received the device authentication request within the specified time measured by said time keeping unit.

5. The data transmitting apparatus according to claim 1,
wherein said device authentication unit performs the device authentication each time the logical transmission path is established by said connection establishment unit, and
said encryption key sharing unit generates the encryption key and allows the shared use of the generated encryption key.

6. The data transmitting apparatus according to claim 1, further comprising:
a transmission mode notification unit operable to notify the data receiving apparatus of a transmission mode which is one of (i) an encryption mode to encrypt and transmit data and (ii) a normal mode to transmit data without performing encryption,
wherein said device authentication unit performs a device authentication for the data receiving apparatus when said transmission mode notification unit notifies the data receiving apparatus of the encryption mode, and
said data transmission unit encrypts and transmits the data when said transmission mode notification unit has notified the data receiving apparatus of the encryption mode, and transmits the data without performing encryption when said transmission mode notification unit has notified the data receiving apparatus of the normal mode.

7. The data transmitting apparatus according to claim 6,
wherein said device authentication unit includes at least one of a first device authentication unit operable to judge whether or not the data receiving apparatus is an unauthorized apparatus, a second device authentication unit operable to judge whether or not the data receiving apparatus is not an unauthorized apparatus and is a valid apparatus, and a third device authentication unit operable to judge whether or not the data receiving apparatus is a valid apparatus, and
said encryption key sharing unit allows shared use of an encryption key in one of the cases: (i) when said first device authentication unit judges that the data receiving apparatus is not an unauthorized apparatus, (ii) when said second device authentication unit judges that the data receiving apparatus is not an unauthorized apparatus and is a valid apparatus, and (iii) when said third device authentication unit judges that the data receiving apparatus is a valid apparatus.

8. The data transmitting apparatus according to claim 6, further comprising:
a receiving apparatus mode notification unit operable to send a device authentication non-acceptance notice to the data receiving apparatus when said data receiving apparatus does not respond normally to the notice sent by said transmission mode notification unit.

9. The data transmitting apparatus according to claim 8,
wherein said data transmission unit does not transmit data when said receiving apparatus mode notification unit sends the device authentication non-acceptance notice.

10. The data transmitting apparatus according to claim 8,
wherein said data transmission unit transmits only the data which need not be encrypted when said receiving apparatus mode notification unit sends the device authentication non-acceptance notice.

11. The data transmitting apparatus according to claim 8, further comprising:
a transmission path releasing unit operable to release the transmission path when said receiving apparatus mode notification unit sends the device authentication non-acceptance notice.

12. The data transmitting apparatus according to claim 1,
wherein the data to be transmitted consists of a set of frames, each of which is a logical transmitting unit, and
wherein, for each of the frames, said data transmission unit updates the encryption key, encrypts the frame using the updated encryption key and transmits the encrypted frame to the data receiving apparatus, and when another frame is to be transmitted, said data transmission unit transmits the encrypted frame to the data receiving apparatus by communicating, using the dedicated area for notifying a status of the transmission, that another frame is to be transmitted.

13. The data transmitting apparatus according to claim 12,
wherein the frame is the data to be transmitted from said data transmitting apparatus to the data receiving apparatus corresponding to a single send request issued from the data receiving apparatus to said data transmitting apparatus.

14. The data transmitting apparatus according to claim 12,
wherein said data transmission unit further updates the encryption key using a unit of a predetermined amount when the frame is bigger than the predetermined amount.

15. The data transmitting apparatus according to claim 12, further comprising:
a frame division unit operable to divide each of the frames into packets, each of the packets being a physical transmitting unit; and
a packet header addition unit operable to add, to each of the packets, a packet header containing information on the packet.

16. The data transmitting apparatus according to claim 15,
wherein, for each of the frames, said data transmission unit encrypts the frame in blocks, each of which is a certain amount of data, and adds padding data to a predetermined packet composing the frame, and the packet header of each of the packets contains information on an effective data size so that the frame may become an integer multiple of each of the blocks when the frame is not an integer multiple of each of the blocks.

17. The data transmitting apparatus according to claim 16,
wherein the data size of each of the packet headers is an integer multiple of each of the blocks.

18. The data transmitting apparatus according to claim 15,
wherein, for each of the packets, said packet header addition unit adds, to the packet, a packet header containing an encryption mode identifier showing a type of encryption being performed for the packet,
each of the frames consists of a plurality of files, and
said data transmitting apparatus further comprises a packet adjustment unit operable to add padding data to the last packet so that the data size of the last packet is adjusted to be the same as the data size of other packets in each of the files other than the file containing the last packet of the frame when the encryption mode identifiers of the plurality of files differ.

19. The data transmitting apparatus according to claim 15, wherein, for each of the packets, said packet header addition unit adds, to the packet, the packet header containing the encryption mode identifier showing the type of encryption being performed for the packet, each of the frames consists of a plurality of files, and said data transmission unit transmits a file of which an encryption mode identifier differs with the use of another frame when the encryption mode identifiers of the plurality of files differ.

20. The data transmitting apparatus according to claim 1, wherein the data to be transmitted consists of frames, each of which is a logical transmitting unit, said data transmitting apparatus further comprises:

a frame division unit operable to divide each of the frames into packets, each of the packets being a physical transmitting unit; and a packet header addition unit operable to add, to each of the packets, a packet header containing a content type identifier showing a handling method in the data receiving apparatus which has received the packet, and said data transmission unit encrypts a packet to which the packet header is added and transmits the encrypted packet.

21. The transmitting apparatus according to claim 20, wherein each of the frames consists of a plurality of files, and said data transmitting apparatus further comprises a packet adjustment unit operable to add padding data to the last packet so that the data size of the last packet is adjusted to be the same as the data size of other packets in each of the files other than the file containing the last packet of the frame when the content type identifiers of the plurality of files differ.

22. The data transmitting apparatus according to claim 21, wherein the data to be transmitted consists of a plurality of frames, and said data transmission unit updates the encryption key, encrypts the frame using the updated encryption key and transmits the encrypted frame to the data receiving apparatus, for each frame.

23. The data transmitting apparatus according to claim 20, wherein each of the frames consists of a plurality of files, and said data transmission unit sends the file of which a content type identifier differs using another frame when the content type identifiers of the plurality of files differ.

24. The data transmitting apparatus according to claim 23, wherein the data to be transmitted consists of a plurality of frames, and said data transmission unit updates the encryption key, encrypts the frame using the updated encryption key and transmits the encrypted frame to the data receiving apparatus, for each frame.

25. The data transmitting apparatus according to claim 1, wherein the communication interface is an IEEE1394 interface, and the asynchronous communication method is an Asynchronous communication method complying with the IEEE1394.

26. A data transmitting apparatus for transmitting data to a data receiving apparatus via a communication interface, the data transmitting apparatus comprising:

a device authentication unit operable to perform a device authentication for the data receiving apparatus in order to establish two or more than two logical transmission paths allowing simultaneous and independent data transmissions between said data transmitting apparatus and the data receiving apparatus;

a first data transmission unit operable to transmit the data to the data receiving apparatus via a first logical transmission path established by the device authentication performed by said device authentication unit; and a second data transmission unit operable to transmit the data to the data receiving apparatus via a second logical transmission path established by the device authentication performed by said device authentication unit, and wherein said device authentication unit performs a device authentication only for the first logical transmission path, generates an encryption key based on a result of the device authentication and allows shared use of the generated encryption key between said data transmitting apparatus and the data receiving apparatus by communicating, using a reserve field in a dedicated area for notifying a status of the transmission, information pertaining to a changing timing of the encryption key, and both of said first and the second data transmission units encrypt data using the encryption key made sharable by said device authentication unit and transmit the encrypted data to the data receiving apparatus.

27. The data transmitting apparatus according to claim 26, wherein the first logical transmission path is a transmission path established by an asynchronous communication method, and the second logical transmission path is a transmission path established by an isochronous communication method.

28. A data receiving apparatus for receiving data from a data transmitting apparatus via a communication interface using an asynchronous communication method, the data receiving apparatus comprising:

a connection establishment unit operable to establish a logical transmission path between the data transmitting apparatus and said data receiving apparatus by exchanging information with the data transmitting apparatus;

a device authentication unit operable to perform a device authentication so that the data transmitting apparatus may authenticate said data receiving apparatus (i) before the logical transmission path is established, (ii) during a process of establishing the logical transmission path, or (iii) after the logical transmission path is established;

an encryption key sharing unit operable to generate an encryption key based on a result of the device authentication performed by said device authentication unit and allow shared use of the generated encryption key between the data transmitting apparatus and said data receiving apparatus by communicating, using a reserve field in a dedicated area for notifying a status of the transmission, information pertaining to a changing timing of the encryption key; and a data reception unit operable to receive the data to be transmitted from the data transmitting apparatus and decrypt the received data using the encryption key made sharable by said encryption key sharing unit.

29. The data receiving apparatus according to claim 28, wherein said device authentication unit includes:

a time keeping unit operable to measure an elapsed time from the time when the logical transmission path is established;

a transmission mode notice reception unit operable to receive a notice of a transmission mode which is one of (i) an encryption mode to encrypt and transmit data and (ii) a normal mode to transmit data without performing encryption; and a notice determination unit operable to determine whether said transmission mode notice reception unit receives the notice of the encryption mode within a specified time measured by said time keeping unit, and wherein said data reception unit decrypts the data transmitted from the data transmitting apparatus using the encryption key when said notice determination unit determines that said transmission mode notice reception unit has received the notice of the encryption mode and treats the data transmitted from the data transmitting apparatus as unencrypted data, and does not decrypt the data when said notice determination unit determines that said transmission mode notice reception unit has not received the notice of the encryption mode and said transmission mode notice reception unit has received the notice of the normal mode.

30. The data receiving apparatus according to claim 28, wherein said device authentication unit performs the device authentication when detecting that said data receiving apparatus and the data transmitting apparatus are connected electrically.

31. The data receiving apparatus according to claim 28, wherein said data reception unit treats the data to be transmitted from the data transmitting apparatus as unencrypted data and does not decrypt the data when the device authentication performed by the data transmitting apparatus for said data receiving apparatus is refused in the device authentication performed by said device authentication unit.

32. The data receiving apparatus according to claim 28, wherein the data to be transmitted from the data transmitting apparatus consists of a set of frames, each of which is a logical transmitting unit, and said data reception unit updates, for each frame composing the received data, the encryption key by communicating, when another data is to be transmitted, using the dedicated area for notifying a status of the transmission, that another frame is to be transmitted, and decrypts the frame using the updated encryption key for each frame.

33. The data receiving apparatus according to claim 32, wherein said data reception unit further updates the encryption key using a unit of a predetermined amount when the frame is larger than the predetermined amount.

34. The data receiving apparatus according to claim 32, wherein said data reception unit further updates the encryption key based on encryption key update information contained in a predetermined header, which is not encrypted, in the frame when the frame is larger than a predetermined amount.

35. The data receiving apparatus according to claim 32, wherein each of the frames consists of a set of packets, each of which is a physical transmitting unit, each of the packets consists of a packet body in which the data to be transmitted from the data transmitting apparatus to said data receiving apparatus is contained being encrypted, and a packet header containing non-encryption information on the packet, and said data reception unit decrypts each of the frames after deleting the packet headers from the frame composing the received data.

36. The data receiving apparatus according to claim 35, wherein, for each of the packets, an effective data length showing an effective length of the data contained in the packet body is contained in the packet header, and said data reception unit extracts the effective data length from the packet header composing the received data, calculates an encrypted data length showing the size of the encrypted data contained in the packet body using the extracted effective data length and decrypts the encrypted data equivalent to the calculated encrypted data length.

37. The data receiving apparatus according to claim 28, wherein the data to be transmitted from the data transmitting apparatus consists of a set of packets, each of which is a physical transmitting unit, each of the packets consists of a packet body in which the data to be transmitted from the data transmitting apparatus to said data receiving apparatus is contained being encrypted, and a packet header containing a content type identifier which shows a handling method in said data receiving apparatus that has received the packets, said data reception unit further extracts the content type identifier from the packet headers of the received data, and said data receiving apparatus further comprises a data processing unit operable to process the data received by said data reception unit using a processing method corresponding to the content type identifier extracted by said data reception unit.

38. The data receiving apparatus according to claim 37, wherein said data processing unit adds, to the data, an encryption mode identifier showing a type of encryption, and prints out the data based on the encryption mode identifier when the content type identifier shows a predetermined value.

39. The data receiving apparatus according to claim 28, wherein the communication interface is an IEEE1394 interface, and the asynchronous communication method is an Asynchronous communication method complying with the IEEE1394.

40. A data transmission system comprising a data transmitting apparatus and a data receiving apparatus that are connected via a communication interface, wherein said data transmitting apparatus includes:

a first connection establishment unit operable to establish a logical transmission path between said data transmitting apparatus and said data receiving apparatus by exchanging information with said data receiving apparatus;

a first device authentication unit operable to perform a device authentication to said data receiving apparatus (i) before the logical transmission path is established, (ii) during a process of establishing the logical transmission path, or (iii) after the logical transmission path is established;

a first encryption key sharing unit operable to generate an encryption key based on a result of the device authentication performed by said first device authentication unit and allow shared use of the generated encryption key between said data transmitting apparatus and said data receiving apparatus by communicating, using a dedicated area for notifying a status of the transmission, information pertaining to a changing timing of the encryption key; and a data transmission unit operable to encrypt data using the shared encryption key and transmit the encrypted data to said data receiving apparatus using an asynchronous communication method, and said data receiving apparatus includes:
- a second connection establishment unit operable to establish a logical transmission path between said data transmitting apparatus and said data receiving apparatus by exchanging information with said data transmitting apparatus;
- a second device authentication unit operable to perform a device authentication so that said data transmitting apparatus may authenticate the data receiving apparatus (i) before the logical transmission path is established, (ii) during a process of establishing the logical transmission path, or (iii) after the logical transmission path is established;
- a second encryption key sharing unit operable to generate an encryption key based on a result of the device authentication performed by said second device authentication unit and allow shared use of the generated encryption key between said data transmitting apparatus and said data receiving apparatus by communicating, using a dedicated area for notifying a status of the transmission, information pertaining to a changing timing of the encryption key; and
- a data reception unit operable to receive data transmitted from said data transmitting apparatus using the asynchronous communication method and decrypt the received data using the encryption key made sharable by said second encryption key sharing unit.

41. A data transmission method for transmitting data to a data receiving apparatus via a communication interface using an asynchronous communication method, the data transmission method comprising:
- a connection establishment step of establishing a logical transmission path between the data receiving apparatus and the data transmitting apparatus by exchanging information with the data receiving apparatus;
- a device authentication step of performing a device authentication for the data receiving apparatus (i) before the logical transmission path is established, (ii) during a process of establishing the logical transmission path, or (iii) after the logical transmission path is established;
- an encryption key sharing step of generating an encryption key based on a result of the device authentication performed in the device authentication step and allowing shared use of the generated encryption key between the data transmitting apparatus and the data receiving apparatus by communicating, using a reserve field in a dedicated area for notifying a status of the transmission, information pertaining to a changing timing of the encryption key; and
- a data transmitting step of encrypting the data using the shared encryption key and transmitting the encrypted data to the data receiving apparatus.

42. A data transmission method for transmitting data to a data receiving apparatus via a communication interface, the data transmission method comprising:
- a device authentication step of performing a device authentication for the data receiving apparatus in order to establish two logical transmission paths allowing simultaneous and independent data transmissions between the data receiving apparatus and the data transmitting apparatus;
- a first data transmitting step of transmitting the data to the data receiving apparatus via a first logical transmission path established by the device authentication in the device authentication step; and
- a second data transmitting step of transmitting the data to the data receiving apparatus via a second logical transmission path established by the device authentication in the device authentication step,
- wherein in the device authentication step, a device authentication is performed only for the first logical transmission path, an encryption key is generated based on a result of the device authentication, and the generated encryption key is shared between the data transmitting apparatus and the data receiving apparatus by communicating, using a reserve field in a dedicated area for notifying a status of the transmission, information pertaining to a changing timing of the encryption key, and
- in both of the first and the second data transmitting steps, the data is encrypted using the encryption key shared in the device authentication step and sent to the data receiving apparatus.

43. A data reception method for receiving data from a data transmitting apparatus via a communication interface using an asynchronous communication method, the data reception method comprising:
- a connection establishing step of establishing a logical transmission path between the data transmitting apparatus and a data receiving apparatus by exchanging information with the data transmitting apparatus;
- a device authentication step of performing a device authentication so that the data transmitting apparatus may authenticate the data receiving apparatus (i) before the logical transmission path is established, (ii) during a process of establishing the logical transmission path, or (iii) after the logical transmission path is established;
- an encryption key sharing step of generating an encryption key based on a result of the device authentication in the device authentication step and allowing shared use of the generated encryption key between the data transmitting apparatus and the data receiving apparatus by communicating, using a reserve field in a dedicated area for notifying a status of the transmission, information pertaining to a changing timing of the encryption key; and
- a data receiving step of receiving the data to be transmitted from the data transmitting apparatus and decrypting the received data using the encryption key made sharable in the encryption key sharing step.

44. A computer storage program embodied on a computer-readable medium, the computer storage program causing a data transmitting apparatus to perform a data transmission method for transmitting data to a data receiving apparatus via a communication interface using an asynchronous communication method, the data transmission method comprising:
- a connection establishing step of establishing a logical transmission path between the data receiving apparatus and the data transmitting apparatus by exchanging information with the data receiving apparatus;
- a device authentication step of performing a device authentication for the data receiving apparatus (i) before the logical transmission path is established, (ii) during a process of establishing the logical transmission path, or (iii) after the logical transmission path is established;
- an encryption key sharing step of generating an encryption key based on a result of the device authentication in the device authentication step and allowing shared use of the generated encryption key between the data transmitting apparatus and the data receiving apparatus by communicating, using a reserve field in a dedicated area for notifying a status of the transmission, information pertaining to a changing timing of the encryption key;

and a data transmitting step of encrypting the data using the shared encryption key and transmitting the encrypted data to the data receiving apparatus.

45. A computer storage program embodied on a computer-readable medium, the computer storage program causing a data transmitting apparatus to perform a data transmission method for transmitting data to a data receiving apparatus via a communication interface, the data transmission method comprising:

a device authentication step of performing a device authentication for the data receiving apparatus in order to establish two logical transmission paths allowing simultaneous and independent data transmissions between the data transmitting apparatus and the data receiving apparatus;

a first data transmitting step of transmitting the data to the data receiving apparatus via a first logical transmission path established by the device authentication in the device authentication step;

a second data transmitting step of transmitting the data to the data receiving apparatus via a second logical transmission path established by the device authentication in the device authentication step, and in the device authentication step, a device authentication is performed only for the first logical transmission path, an encryption key is generated based on a result of the device authentication, and the generated encryption key is shared between the data transmitting apparatus and the data receiving apparatus by communicating, using a reserve field in a dedicated area for notifying a status of the transmission, information pertaining to a changing timing of the encryption key, and in the first and the second data transmitting steps, the data is encrypted using the encryption key made sharable in the device authentication step and transmitted to the data receiving apparatus.

46. A computer storage program embodied on a computer-readable medium, the computer-readable medium causing a data receiving apparatus to perform a data reception method for receiving data from a data transmitting apparatus via a communication interface using an asynchronous communication method, the data reception method comprising:

a connection establishing step of establishing a logical transmission path between the data transmitting apparatus and the data receiving apparatus by exchanging information with the data transmitting apparatus;

a device authentication step of performing a device authentication so that the data transmitting apparatus may authenticate the data receiving apparatus (i) before the logical transmission path is established, (ii) during a process of establishing the logical transmission path, or (iii) after the logical transmission path is established;

an encryption key sharing step of generating an encryption key based on a result of the device authentication in the device authentication step and allowing shared use of the generated encryption key between the data transmitting apparatus and the data receiving apparatus by communicating, using a reserve field in a dedicated area for notifying a status of the transmission, information pertaining to a changing timing of the encryption key;

and a data receiving step of receiving the data to be transmitted from the data transmitting apparatus and decrypting the received data using the encryption key made sharable in the encryption key sharing step.

* * * * *